US012521017B2

(12) United States Patent
Grazioso et al.

(10) Patent No.: US 12,521,017 B2
(45) Date of Patent: Jan. 13, 2026

(54) SYSTEM FOR THE IMAGE ACQUISITION AND THREE-DIMENSIONAL DIGITAL RECONSTRUCTION OF THE HUMAN ANATOMICAL SHAPES AND METHOD OF USE THEREOF

(71) Applicant: BEYONDSHAPE S.R.L., Naples (IT)

(72) Inventors: Stanislao Grazioso, Castellammare di Stabia (IT); Giuseppe Di Gironimo, Naples (IT); Roberta Antonia Ruggiero, Casoria (IT); Teodorico Caporaso, Benevento (IT); Mario Selvaggio, Acerra (IT); Dario Panariello, Colli del Tronto (IT); Angela Palomba, Gragnano (IT); Anna Grazioso, Castellammare di Stabia (IT)

(73) Assignee: BEYONDSHAPE S.R.L., Naples (IT)

( * ) Notice: Subject to any disclaimer, the term of this patent is extended or adjusted under 35 U.S.C. 154(b) by 0 days.

(21) Appl. No.: 18/283,440

(22) PCT Filed: Mar. 22, 2022

(86) PCT No.: PCT/EP2022/057455
§ 371 (c)(1),
(2) Date: Sep. 21, 2023

(87) PCT Pub. No.: WO2022/200326
PCT Pub. Date: Sep. 29, 2022

(65) Prior Publication Data
US 2024/0164644 A1 May 23, 2024

(30) Foreign Application Priority Data
Mar. 22, 2021 (IT) .................. 102021000006881

(51) Int. Cl.
A61B 5/00 (2006.01)
A61B 5/107 (2006.01)

(52) U.S. Cl.
CPC .......... *A61B 5/0064* (2013.01); *A61B 5/1075* (2013.01); *A61B 5/1079* (2013.01)

(58) Field of Classification Search
None
See application file for complete search history.

(56) References Cited

U.S. PATENT DOCUMENTS 10,210,646 B2 2/2019 Moore et al.
10,824,055 B1 * 11/2020 McGuire .................. F21S 4/28
(Continued)

FOREIGN PATENT DOCUMENTS

DE 102016007103 A1 12/2016
EP 3318838 A1 5/2018
(Continued)

OTHER PUBLICATIONS

International Search Report dated Jun. 29, 2022, issued in connection with PCT/EP2022/057455.
(Continued)

Primary Examiner — Yi-Shan Yang
(74) Attorney, Agent, or Firm — Akerman LLP

(57) ABSTRACT

A system for the image acquisition and three-dimensional digital reconstruction of human anatomical shapes is described, comprising a plurality of elements for the instant and synchronized acquisition of images and for sending, optionally wirelessly, information associated with the acquired images, a central processing unit for the reconstruction of a three-dimensional digital model starting from this information, a control device which is able to transmit the information associated with the acquired images to said central processing unit and/or to receive information relating (Continued)

to the obtained three-dimensional digital model, as well as at least one unit for transmitting. optionally wirelessly, the information associated with the images acquired by said plurality of elements for the instant and synchronized acquisition of images towards the control device; a process for the image acquisition and three-dimensional digital reconstruction of human anatomical shapes is also described.

12 Claims, 15 Drawing Sheets

(56) References Cited

U.S. PATENT DOCUMENTS

| | | | |
|---|---|---|---|
| 2010/0239135 A1* | 9/2010 | Luisi | F16M 11/041 |
| | | | 382/128 |
| 2012/0206587 A1 | 8/2012 | Oz et al. | |
| 2015/0304530 A1* | 10/2015 | Courteille | H04N 13/243 |
| | | | 348/48 |
| 2019/0212135 A1* | 7/2019 | Basler | G01C 11/025 |
| 2019/0371059 A1* | 12/2019 | Toubal | G06T 17/205 |
| 2021/0279900 A1* | 9/2021 | Schwartz | G01B 11/245 |

FOREIGN PATENT DOCUMENTS

| | | | | |
|---|---|---|---|---|
| GB | 2535742 A | * | 8/2016 | H04N 13/204 |
| WO | WO-2012011068 A1 | * | 1/2012 | A61B 5/1079 |
| WO | 2020/231656 A2 | | 11/2020 | |

OTHER PUBLICATIONS

Written Opinion of the International Searching Authority dated Jun. 29, 2022, issued in connection with PCT/EP2022/057455.

* cited by examiner

| Parts of the body | U, 3° p | U, 50° p | U, 97° p | D, 3° p | D, 50° p | D, 97° p | Average length (l) [mm] | Average Diameter (φ) [mm] |
|---|---|---|---|---|---|---|---|---|
| Total (T) | 1645 | 1760 | 1880 | 1515 | 1630 | 1740 | 1695 | 400 |
| Head (Te) | 230 | 246 | 262 | 213 | 229 | 244 | 237 | 200 |
| Trunk (Tr) | 513 | 549 | 587 | 537 | 578 | 617 | 564 | 400 |
| Legs + feet (GP) | 902 | 965 | 1031 | 765 | 823 | 879 | 894 | 118 |
| Trunk + Legs + feet (TGP) | 1416 | 1515 | 1618 | 1302 | 1401 | 1496 | 1458 | 106 |
| Arms (B) | 602 | 644 | 688 | 554 | 596 | 636 | 620 | 150 |

FIG. 4a

|  | $ncv_i$ [-] | Number of "vertical pillars" | Involved "vertical pillars" | Total number of cameras (max) | $h_i$ [mm] | $dv_i$ [mm] | $\delta$ [deg] | $\varepsilon$ [deg] |
|---|---|---|---|---|---|---|---|---|
| (100) Trunk, legs, feet | 8 | 18 | all | 144 | 256 | 202 | 0 | 0 |
| (200) Head | 2 | 9 | all (offset) | 18 | 1904 | 196 | +14 | 0 |
| (300) Upper limbs (external area) | 3 | 3·2=6 | IV,V,VI XIII,XIV,XV | 18 | 1350 | 215 | +20 | 0 |
| (400) Upper limbs (underarms) | 2 | 2·2=4 | I, XVIII IX,X | 8 | 346 | 202 | -31 | $ncv_{4,1}$: ±8 $ncv_{4,2}$: ±1 |
| (500) Lower limbs (leg internal part) | 4 | 2·2=4 | I, XVIII IX,X | 16 | 101 | 202 | 0 | ±17 |
| (600) Lower limbs (underthigh) | 1 | 2·2=4 | I, XVIII IX,X | 4 | 224 | - | -37 | 0 |
| (700) Feet | 1 | 2 | I, XVIII | 2 | 894 | - | +38 | ±3 |

FIG. 5

- Trunk, legs and feet cameras (100)
- Head cameras (200)
- Upper limbs (external area) cameras (300)
- Upper limbs (under-arms area) cameras (400)
- Lower limbs (leg internal part) cameras (500)
- Lower limbs (under-thigh) cameras (600)
- Feet cameras (700)

Piano 2 = Plane 2
Piano 3 = Plane 3

SYSTEM FOR THE IMAGE ACQUISITION AND THREE-DIMENSIONAL DIGITAL RECONSTRUCTION OF THE HUMAN ANATOMICAL SHAPES AND METHOD OF USE THEREOF

CROSS-REFERENCE TO RELATED APPLICATIONS

This application is a national phase of PCT/EP2022/057455, filed Mar. 22, 2022, and claims priority to Italian Patent Application No. 102021000006881, filed Mar. 22, 2021, the entire contents of both of which are hereby incorporated by reference.

FIELD OF APPLICATION

The present invention relates to a system comprising components of the mechanical and electronic type for the image acquisition and three-dimensional digital reconstruction of human anatomical shapes and the subsequent automatic derivation from a so-obtained model of anatomical landmarks, anthropometric measurements, volumetric indices of parts of the body of the subject to be photographed and/or specific body parameters.

Specifically, the system comprises elements for the instant and synchronized acquisition of images and for sending, optionally wirelessly, information associated with the acquired images, at least one unit for transmitting, particularly sending and receiving, optionally wirelessly, the information associated with the detected images, as well as a central processing unit for the reconstruction of a three-dimensional digital model starting from this information.

More specifically, the elements for the instant and synchronized acquisition of images comprise integrated optical sensors, more precisely photographic sensors, for the instant and synchronized acquisition of images.

Moreover, the present invention relates to a process for the image acquisition and three-dimensional digital reconstruction of human anatomical shapes through the use of the above system and for the subsequent automatic derivation from a so-obtained model of anatomical landmarks, anthropometric measurements, volumetric indices of parts of the body of the subject to be photographed and/or specific body parameters.

PRIOR ART

The need to acquire information about the body conformation of human beings without subjecting the subjects to treatments which are invasive or anyway potentially dangerous for human health is well known in the art and very topical.

Particular reference is made to diagnostic imaging techniques, such as for example X-ray radiography, which are useful to obtain information about the morphological features of bone portions.

Moreover, depending on the fields of application and on the field needs, much attention is paid to practices for detecting anthropometric measurements during which otherwise-inevitable detection errors are as minimized as possible.

The fields of application in which detection errors are particularly unwelcome not only include the medical and biomedical field, but also the fashion and sports equipment industry or other specialized fields, such as the naval, aeronautical or aerospace one, as well as the industrial ergonomics one.

For example, the need to acquire information about exact and accurate measurements of the human body is considered, for the customized production of clothing and wearable devices, particularly overalls, harnesses or personal protection devices in the field of workplace safety or, in the field of sports, for customized sportswear, sport climbing or diving.

Moreover, the need to acquire information about precise measurements of the human body is particularly felt also in the customized production, for medical and biomedical applications, such as customized orthoses and prostheses.

Systems for scanning subjects by means of photographic devices are also known in the art.

These systems comprise a set of devices such as photographic depth sensors, which are suitable for acquiring a plurality of images, which are useful for the reconstruction of a three-dimensional model of an object or also of parts of the body, for example of the back, of the trunk, of a limb or of the skull when scanning is performed on a human or animal subject.

In this case, these systems generally comprise a fixed structure, on which the set of devices comprising the photographic depth sensors is arranged, and a usually rotating platform, on which the subject to be scanned is invited to rest during the image acquisition.

Nevertheless, these systems for the image acquisition are not particularly precise or, in any case, during scanning, the subject, often in the attempt to compensate for the imbalance feeling due to the platform rotary movement, makes little movements which determine a greater complexity in the subsequent three-dimensional reconstruction.

A system of this type is described for example in U.S. patent Ser. No. 10/210,646 B2.

There are also systems comprising a cabin or anyway a framework having a polygonal or pseudo-circular shape on which devices comprising photographic sensors are arranged and in which the subject can enter to let the scanning be performed, that is the image acquisition.

A system of this type is described in patent application published under No. DE102016007103, which provides the revolution of devices comprising optical sensors on a track constructed on a structure formed around the subject.

Furthermore, according to this known solution, the shoot of a plurality of photographs is provided, according to different angles, during the revolution of the optical devices along the arranged track.

Therefore, in this case, during the revolution of the optical devices along the track, the subject will certainly make movements which, although being little, will determine inaccuracies or anyway complications on occasion of the subsequent three-dimensional reproduction.

Moreover, according to this technical solution, a three-dimensional reconstruction of a subject or of parts of the body is not provided but only the storage and subsequent processing of two-dimensional images for the purposes of dermatological diagnoses.

The patent EP3318838 B1 describes a system comprising photographic sensors in which the inclination angle of the optical axis with respect to a fixed point of the subject to be photographed can be modified.

Moreover, the system comprises an actuator and a controller for adjusting the inclination of the photographic sensors around the sole lateral direction in the plane of the integrated optical sensor and, therefore, from top to bottom.

In this further known solution, sensors are distributed around the subject to be photographed on a support structure and during the scanning of the subject to be photographed it is required that the photographic sensors vary the inclination angle thereof for the acquisition of different images for different angles of the photographical sensor.

In particular, WO2012011068 discloses a method for the identification and anthropometric classification of the human body which comprises steps of acquiring images of the body by means of a scanning apparatus provided with a plurality of acquisition devices placed around the sample to be scanned. However, during the acquisition of the images by means of the plurality of acquisition devices, each of them is rotated about a horizontal axis thereof.

Although the inclination of the photographic sensors can be controlled, scanning requires in this case that a plurality of photographs are shot during a certain period of time, that is for the entire duration of the inclination movement of the photographic sensors.

Thus, in this case too, during scanning, there is the real risk that the subject makes even little movements, which determine not very precise acquired images or anyway complications on occasion of the subsequent three-dimensional reproduction.

GB2535742A discloses a 3D scanning apparatus comprising an image capturing master module and one or more image capturing slave modules. The apparatus may also include cameras that can be moveably mounted on the capturing master module and the or each slave module. A method includes adjusting the height and the angular position of the or each camera about one or more axes of the respective master module and/or the or each slave module.

Similarly, U.S. Ser. No. 10/824,055B1 discloses a modular imaging system which comprises multiple panels. The modular imaging enclosure can be easily transported to the location of an object(s) to be imaged. This apparatus is indeed specifically designed for scanning objects and comprises an array of cameras, which are fixedly arranged on said multiple panels. The cameras may be fixed at a particular location on the side panel, while their field of views (FOV) is adjustable, whether the adjustment is done manually and/or electronically (e.g., programmatically via the camera controller(s)).

US2019371059 discloses a method for creating a three-dimensional virtual representation of a person, comprising the step of acquiring a plurality of images of a person located in a reference position in an imaging cabin. Such imagine cabin comprises at least eighty image sensors. This document is silent about the specific location and orientation of the image sensors inside of the cabin.

Ultimately, the need to provide a system for the acquisition of images of an object or subject is thus still particularly felt in the field, which is innovative and alternative to the normally used ones, with particular reference to the above-described prior art, and which solves the limitations of the above-quoted solutions, in particular the problems linked to the complexity of acquisition in addition to the precision of the acquired images and, especially, which is specific for the acquisition of the human anatomical shapes and which is able to acquire also complex areas of the human body.

The technical problem underlying the present invention is therefore to provide a system and a process for the image acquisition and three-dimensional digital reconstruction of human anatomical shapes which do not provide either the rotation of the subject to be photographed, or any type of movement of the photographic elements of the system during the scanning the subject to be photographed, ensuring the acquisition of a sufficient and considerable number of images from different positions and angles in order to reconstruct a digital and three-dimensional model, as well as then automatically derive therefrom anatomical landmarks, anthropometric measurements, volumetric indices of parts of the body of the subject to be photographed and/or specific body parameters, which are as accurate and faithful as possible with respect to the anatomical shapes of the subject to be photographed.

SUMMARY OF THE INVENTION

This technical problem is solved, according to the present invention, by a system for the image acquisition and three-dimensional digital reconstruction of human anatomical shapes comprising a plurality of elements for the instant and synchronized acquisition of images and for sending, optionally wirelessly, information associated with the acquired images, a central processing unit for the reconstruction of a three-dimensional digital model starting from this information, a control device which is able to transmit the information associated with the acquired images to the central processing unit and/or to receive information relating to the three-dimensional digital model and, at least, a unit for transmitting, optionally wirelessly, the information associated with the images acquired by the plurality of elements for the instant and synchronized acquisition of images towards the control device.

Specifically, the elements for the instant and synchronized acquisition of images are fixedly anchored to a support structure, said support structure being suitable for resting on a walking plane, specifically on the ground, and having a development which is suitable for surrounding a subject to be photographed, and they are mutually arranged vertically at preset heights and horizontally at a given distance along the development of the support structure, and comprise integrated optical sensors.

The above central processing unit is set up to reconstruct the three-dimensional digital model by photogrammetry.

In particular, the terms horizontal and vertical are used with reference to a support structure which rests on the ground or on a walking plane which defines a horizontal direction and which orthogonally develops therefrom according to a vertical direction.

Specifically, the above integrated optical sensors of each of said elements for the instant and synchronized acquisition of images have an optical axis having a first inclination angle which is fixed and preset with respect to the horizontal direction, defined by a horizontal plane which is parallel to the walking plane which the support structure rests on, and a second inclination angle which is fixed and preset with respect to the vertical direction, defined by a plane which is perpendicular to the walking plane.

Precisely, the first fixed and preset inclination angle corresponds to the so-called pitch, that is to the rotation of the integrated optical sensor around its lateral direction of the plane of the photographical sensor (direction which goes from left to right) and the second fixed and preset inclination angle corresponds to the so-called yaw, that is to the rotation of the integrated optical sensor around the normal direction of the plane of the photographical sensor (direction which goes from top to bottom).

Pursuant to the present invention, the expression "fixedly" means that each element for the instant and synchronized acquisition of images is firmly anchored to the support structure and the position thereof, with respect to the remaining devices for the instant and synchronized acquisition of images or with respect to the subject to be photographed, cannot be modified by the operator or automatically by a system control program.

At the same time, in each element for the instant and synchronized acquisition of images, the inclinations of the optical sensor integrated therein, with respect to the remaining devices for the instant and synchronized acquisition of images or with respect to the subject to be photographed, cannot be modified by the operator or automatically by a system control program.

In fact, the position and/or the inclination of each device for the instant and synchronized acquisition of images can be modified only through disassembling and assembling operations of the system itself by skilled technicians, i.e. personnel which is properly trained and different from the operator or user of the system according to the present invention.

Consistently, with reference to the above-mentioned integrated optical sensors, the term "fixed" means that the first and the second preset inclination angles thereof cannot be modified, in particular during the instant and synchronized acquisition of the images, that is during the scanning of the subject to be photographed.

Accordingly, in each element for the instant and synchronized acquisition of images, for each optical sensor integrated therein, the first inclination angle of the optical axis, which is fixed with respect to the horizontal direction, is defined by a horizontal plane which is parallel to the walking plane which the support structure rests on, and the second inclination angle of the optical axis, which is fixed with respect to the vertical direction, is defined by a plane which is perpendicular to the walking plane, are fixed.

In particular, each element for the instant and synchronized acquisition of images, for each optical sensor integrated therein, is designed to maintain fixed the first inclination angle of the optical axis, which is fixed with respect to the horizontal direction, defined by a horizontal plane which is parallel to the walking plane which the support structure rests on, and the second inclination angle of the optical axis, which is fixed with respect to the vertical direction, is defined by a plane which is perpendicular to the walking plane.

More in particular, in each element for the instant and synchronized acquisition of images, each optical sensor integrated therein is designed to maintain fixed said first inclination angle and said second inclination angle of the optical axis during the instant and synchronized acquisition of images.

Precisely, with reference to the elements for the instant and synchronized acquisition of images, the expression "preset heights" means that the elements for the instant and synchronized acquisition of images are anchored to the support structure at predetermined heights with respect to the ground or the walking plane.

According to a preferred embodiment, said elements for the instant and synchronized acquisition of images are suitable for wirelessly sending information associated with the acquired images and said unit for transmitting information associated with the images acquired by the plurality of elements for the instant and synchronized acquisition of images towards the control device is suitable for wirelessly transmitting this information.

Preferably, the preset heights are arranged on the basis of the stature percentiles of the subjects to be photographed.

More preferably, these preset heights were arranged on the basis of a stature percentile of the subjects to be photographed comprised between the $3^{rd}$ and the $97^{th}$ percentile, still more preferably equal to the $3^{rd}$, the $50^{th}$ and/or the $97^{th}$ percentile.

In an equally preferred way, the preset heights were arranged on the basis of the stature percentiles of the female or male subjects to be photographed.

In other words, depending on the prevailing sex, age or race of the subjects to be photographed, the preset heights might be arranged in a different manner.

According to a particular mode of use of an embodiment of the system according to the present invention, the elements for the instant and synchronized acquisition of images are arranged and positioned at preset heights on said support structure and said fixed and preset first inclination angle and/or said fixed and preset second inclination angle of the optical axis of said optical sensors integrated therein are selected on the basis of an average between the following stature percentiles of the subject to be photographed: $3^{rd}$ percentile of male subjects, $50^{th}$ percentile of male subjects, $97^{th}$ percentile of male subjects, $3^{rd}$ percentile of female subjects, $50^{th}$ percentile of female subjects and $97^{th}$ percentile of female subjects.

Advantageously, the installation of the elements for the instant and synchronized acquisition of images according to an average of the different percentiles of the embodiment of the previous paragraph allows a quite consistent and robust distribution thereof on the development of the above-mentioned support structure with respect to the anthropometric features of the subjects to be photographed.

For these reasons, when compared with known apparatus according to the prior art, the system according to the present invention allows to solve the aforementioned technical problem without the need to move these elements for the instant and synchronized acquisition of images and/or modify inclination angles of the optical axis of the optical sensors integrated therein.

This embodiment can be easily used not only for the image acquisition and three-dimensional digital reconstruction of human anatomical shapes of adult individuals, but also of pubescent or prepubescent individuals, for example by means of an appropriate step stool or platform.

In fact, this step stool or platform allows the central and upper part of the body of individuals with a height which is incompatible with the preset heights, at which the elements for the instant and synchronized acquisition of images are positioned, to be properly photographed by the latter elements.

Preferably, the elements for the instant and synchronized acquisition of images are generally positioned at preset heights comprised between 0 meters and 2.20 meters, more preferably between 0.10 meters and 2.10 meters with respect to the ground or the walking plane.

Advantageously, the system according to the present invention provides that the elements for the instant and synchronized acquisition of images are properly arranged, vertically, at different preset heights with respect to each other and, horizontally, at a given distance with respect to each other between horizontally adjacent elements for the instant and synchronized acquisition of images, so that they can globally acquire such a sufficient and considerable number of images as to allow the central processing unit to reconstruct an accurate and faithful three-dimensional digital model of the human anatomical shapes with respect to the real anatomical shapes of the subject to be photographed.

Preferably, the elements for the instant and synchronized acquisition of images comprise means for the synchronous image acquisition.

Preferably, the elements for the instant and synchronized acquisition of images can be mutually arranged vertically at at least two, more preferably at least eight, still more preferably at least nine, different preset heights on the support structure.

More preferably, the elements for the instant and synchronized acquisition of images are mutually arranged vertically at at least eight preset heights which are different from each other.

In a fully preferred way, the elements for the instant and synchronized acquisition of images are arranged vertically at thirteen different preset heights on the support structure.

In essence, the elements for the instant and synchronized acquisition of images are arranged vertically on more levels, each of them being placed at the determined preset height and at which several elements for the instant and synchronized acquisition of images are located.

Preferably, from the point of view of the mutual positioning on a horizontal axis, the given distance of the elements for the instant and synchronized acquisition of images along the above-mentioned development of the support structure is equal to $$do_R = 2r \sin(\beta/2)$$

wherein r is the radius of the circumference described by the development of the support structure and $\beta$ is the angle in the center subtended by a chord of length $do_R$ which ideally joins two horizontally adjacent elements for the instant and synchronized acquisition of images, and wherein $\beta$ is less than or equal to 90°.

More preferably, $\beta$ is less than or equal to 30°, still preferably it is less than or equal to 25°, in a fully preferred way it is equal to 20°.

Preferably, the radius r of the circumference described by the development of the above-mentioned support structure can take a value comprised between 1 meter and 2 meters, more preferably between 1 meter and 1.4 meters, more preferably equal to 1.2 meters.

In other words, for a support structure with a development having a circumference of radius R which is equal to 1.2 meters, setting $\beta$ equal to 20°, in which the elements for the instant and synchronized acquisition of images are arranged the one onto the other in 18 vertical pillars and the number of elements for the instant and synchronized acquisition of images for each vertical pillar ranges between 8 and 13, depending on the vertical pillar; the distance between horizontally adjacent elements for the instant and synchronized acquisition of images is equal to 0.417 m.

In a fully preferred way, the total number of elements for the instant and synchronized acquisition of images of the above-mentioned plurality of elements for the instant and synchronized acquisition of images is comprised between 100-220, still more preferably between 140-210.

Preferably, the support structure of the system according to the present invention can be substantially cylindrical, that is it can comprise a framework or a modular wall having a circular or substantially circular horizontal section.

In an equally preferred way, the support structure of the system according to the present invention, more precisely the framework or the modular wall of this structure, can comprise an opening.

This opening advantageously allows a convenient access to the subject to be photographed into the structure itself, which—as previously said—has a development which is suitable for surrounding the subject to be photographed.

Preferably, the framework of the support structure of the system according to the present invention comprises a plurality of vertical pillars on which the elements for the instant and synchronized acquisition of images are arranged, the one above the other at determined distances.

In other words, for a support structure with a development having a circumference of radius R which is equal to 1.2 meters, setting $\beta$ equal to 20°, in which the elements for the instant and synchronized acquisition of images are arranged the one onto the other in 18 vertical pillars, in which a vertical pillar is not present for allowing the above opening to be arranged, and the number of elements for the instant and synchronized acquisition of images has a number ranging between 9 and 13 depending on the vertical pillar, the total number thereof is equal to 210.

The above-mentioned elements for the instant and synchronized acquisition of images are mutually arranged vertically at at least one given preset height or at a plurality of given preset heights, which are intermediate between a minimum height and a maximum height from the walking plane.

According to a preferred embodiment of the system of the present invention, the above-mentioned elements for the instant and synchronized acquisition of images are mutually arranged vertically, partially or in their entirety, between a first preset height and a second preset height, wherein the first inclination angle and/or the second inclination angle are zero, precisely for the integrated optical sensors of elements for the instant and synchronized acquisition of images comprised between the first preset height and the second preset height.

Preferably, in the latter preferred embodiment, the apparatus according to the present invention comprises one hundred thirty-six (or one hundred forty-four according to a different configuration) elements for the instant and synchronized acquisition of images Preferably, the first preset height is comprised between 0 m and 0.3 m with respect to the ground or the walking plane and the second preset height is comprised between 1.5 m and 2 m with respect to the ground or the walking plane.

More preferably, the elements for the instant and synchronized acquisition of images may be partially arranged at a determined preset height which is different from said given preset heights, which are intermediate between said first preset height and said second preset height.

Preferably, at least a portion of said plurality of the elements for the instant and synchronized acquisition of images may be arranged at a determined preset height which is higher than said second preset height.

More preferably, the first fixed and preset inclination angle (i.e. pitch) of the optical axis with respect to the horizontal direction of the integrated optical sensors of at least a portion of said plurality of elements for the instant and synchronized acquisition of images, partially arranged at a determined preset height which is different from said given preset heights, is comprised between −45 and +45 degrees, preferably between −38 and +38 degrees, and/or the second fixed and preset inclination angle (i.e. yaw) of the optical axis with respect to the vertical direction of the integrated optical sensors of at least a portion of said plurality of elements for the instant and synchronized acquisition of images, partially arranged at a determined height which is different from said given heights, is comprised between −20 and +20 degrees, preferably between −17 and +17 degrees.

Indeed, in general, the first fixed and preset inclination angle (i.e. pitch) of the optical axis with respect to the horizontal direction of the integrated optical sensors of at least a portion of said plurality of elements for the instant and synchronized acquisition of images is comprised between −45 and +45 degrees, preferably between −38 and +38 degrees, and/or the second fixed and preset inclination angle (i.e. yaw) of the optical axis with respect to the vertical direction of the integrated optical sensors of at least a portion of said plurality of elements for the instant and synchronized acquisition of images is comprised between −20 and +20 degrees, preferably between −17 and +17 degrees.

Specifically, this specific configuration is particularly advantageous when the present system is used for the image acquisition and three-dimensional digital reconstruction of human anatomical shapes in which it is necessary to collect information about surfaces of the body which do not develop longitudinally with respect to the above-mentioned vertical direction of the structure or which develop longitudinally or orthogonally with respect to the latter direction, but are partially darkened by other parts of the body which are more exposed.

For example, the latter configuration is particularly advantageous for the acquisition and three-dimensional digital reconstruction, as well as for the subsequent automatic derivation of landmarks, anthropometric measurements, volumetric indices of parts of the body of the subject to be photographed, such as the skull, upper part of the shoulders and external part of the arms, internal part of the arms, internal part of the legs, part corresponding to the under-thigh, feet and/or specific body parameters.

According to an even preferred embodiment, at least eighteen, of said elements for the instant and synchronized acquisition of images are positioned on said support structure at a height comprised between 1.85 m and 2.2 m, and the first fixed and preset inclination angle (i.e. pitch) of the optical axis with respect to the horizontal direction of the optical sensors integrated therein is comprised between +10 and +20 degrees, preferably is equal to +14 degrees, wherein each of said at least eighteen of said elements for the instant and synchronized acquisition of images is mutually arranged horizontally at a given distance along the development of the support structure, which is different between one another.

More preferably, at least nine of said elements for the instant and synchronized acquisition of images are positioned on said support structure at a height comprised between 1.90 m and 1.92 m, even more preferably equal to 1.904 m, and at least nine of said elements for the instant and synchronized acquisition of images are positioned on said support structure at a height comprised between 2.08 m and 2.12 m, even more preferably equal to 2.10 m, and the first fixed and preset inclination angle (i.e. pitch) of the optical axis with respect to the horizontal direction of the optical sensors integrated therein is comprised between +10 and +20 degrees, even more preferably is equal to +14 degrees.

Even more preferably, the second fixed and preset inclination angle (i.e. yaw) of the optical axis with respect to the horizontal direction of the optical sensors integrated therein is equal to zero degrees.

The latter configuration is particularly advantageous for the acquisition and three-dimensional digital reconstruction, as well as for the subsequent automatic derivation of anatomical landmarks, anthropometric measurements, volumetric indices of parts of the body of the subject to be photographed, such as the skull.

Preferably, at least eighteen of said elements for the instant and synchronized acquisition of images are positioned on said support structure at a height comprised between 1.30 m and 1.8 m, and the first fixed and preset inclination angle (i.e. pitch) of the optical axis with respect to the horizontal direction of the optical sensors integrated therein is comprised between +18 and +22 degrees, more preferably is equal to +20 degrees, wherein each of said at least eighteen of said elements for the instant and synchronized acquisition of images is mutually arranged horizontally at a given distance along the development of the support structure, which is different between one another.

More preferably, at least six of said at least eighteen of said elements for the instant and synchronized acquisition of images are positioned on said support structure at a height equal to 1.350 m, at least six of said at least eighteen of said elements for the instant and synchronized acquisition of images are positioned on said support structure at a height equal to 1.565 m, and at least six of said at least eighteen of said elements for the instant and synchronized acquisition of images are positioned on said support structure at a height equal to 1.78 m, and the first fixed and preset inclination angle (i.e. pitch) of the optical axis with respect to the horizontal direction of the optical sensors integrated therein is comprised between +18 and +22 degrees, preferably is equal to +20 degrees.

Even more preferably, the second fixed and preset inclination angle (i.e. yaw) of the optical axis with respect to the horizontal direction of the optical sensors integrated therein is equal to zero degrees.

The latter configuration is particularly advantageous for the acquisition and three-dimensional digital reconstruction, as well as for the subsequent automatic derivation of anatomical landmarks, anthropometric measurements, volumetric indices of parts of the body of the subject to be photographed, such as the skull, upper part of the shoulders and external part of the arms.

Preferably, at least eight of said elements for the instant and synchronized acquisition of images are positioned on said support structure at a height comprised between 0.34 m and 0.56 m, and the first fixed and preset inclination angle (i.e. pitch) of the optical axis with respect to the horizontal direction of the optical sensors integrated therein is comprised between −28 degrees and −34 degrees, more preferably is equal to −31 degrees, wherein each of said at least eighteen of said plurality of elements for the instant and synchronized acquisition of images is mutually arranged horizontally at a given distance along the development of the support structure, which is different between one another.

More preferably, at least four of said at least eight of said elements for the instant and synchronized acquisition of images are positioned on said support structure at a height equal to 0.346 m, and at least four of said at least eight of said elements for the instant and synchronized acquisition of images are positioned on said support structure at a height equal to 0.548 m, and the first fixed and preset inclination angle (i.e. pitch) of the optical axis with respect to the horizontal direction of the optical sensors integrated therein is comprised between −28 degrees and −34 degrees, more preferably is equal to −31 degrees.

Even more preferably, in the at least four of said at least eight of said elements for the instant and synchronized acquisition of images positioned on said support structure at a height equal to 0.346 m the second fixed and preset inclination angle (i.e. yaw) of the optical axis with respect to the horizontal direction of the optical sensors integrated therein is comprised between −8 and +8 degrees; and, in the at least four of said at least eight of said elements for the instant and synchronized acquisition of images positioned on said support structure at a height equal to 0.548 m the second fixed and preset inclination angle (i.e. yaw) of the optical axis with respect to the horizontal direction of the optical sensors integrated therein is comprised between −1 and +1 degrees.

The latter configuration is particularly advantageous for the acquisition and three-dimensional digital reconstruction, as well as for the subsequent automatic derivation of landmarks, anthropometric measurements, volumetric indices of parts of the body of the subject to be photographed, such as the skull, upper part of the shoulders and external part of the arms and internal part of the arms.

Preferably, at least sixteen of said elements for the instant and synchronized acquisition of images are positioned on said support structure at a height comprised between 0.1 m and 0.8 m, the first fixed and preset inclination angle (i.e. pitch) of the optical axis with respect to the horizontal direction is equal to zero degrees, and the second fixed and preset inclination angle (i.e. yaw) of the optical axis with respect to the horizontal direction is comprised between −17 and +17 degrees, wherein each of said at least sixteen of said plurality of elements for the instant and synchronized acquisition of images is mutually arranged horizontally at a given distance along the development of the support structure, which is different between one another.

More preferably, at least four of said at least eight of said elements for the instant and synchronized acquisition of images are positioned on said support structure at a height equal to 0.101 m, at least four of said at least eight of said elements for the instant and synchronized acquisition of images are positioned on said support structure at a height equal to 0.303 m, at least four of said at least eight of said elements for the instant and synchronized acquisition of images are positioned on said support structure at a height equal to 0.505 m, and at least four of said at least eight of said elements for the instant and synchronized acquisition of images are positioned on said support structure at a height equal to 0.707 m.

The latter configuration is particularly advantageous for the acquisition and three-dimensional digital reconstruction, as well as for the subsequent automatic derivation of landmarks, anthropometric measurements, volumetric indices of parts of the body of the subject to be photographed, such as the skull, upper part of the shoulders, external part of the arms, internal part of the arms and internal part of the legs.

Preferably, at least four of said elements for the instant and synchronized acquisition of images are positioned on said support structure at a height comprised between 0.22 m and 0.28 m, more preferably at 0.224, the first fixed and preset inclination angle (i.e. pitch) of the optical axis with respect to the horizontal direction is comprised between −40 and −35 degrees, preferably equal to −37 degrees, and the second fixed and preset inclination angle (i.e. yaw) of the optical axis with respect to the horizontal direction is equal to zero degrees, wherein each of said at least four of said plurality of elements for the instant and synchronized acquisition of images is mutually arranged horizontally at a given distance along the development of the support structure, which is different between one another.

The latter configuration is particularly advantageous for the acquisition and three-dimensional digital reconstruction, as well as for the subsequent automatic derivation of landmarks, anthropometric measurements, volumetric indices of parts of the body of the subject to be photographed, such as the skull, upper part of the shoulders, external part of the arms, internal part of the arms, internal part of the legs and lower part of the thighs.

Then, preferably, at least two of said elements for the instant and synchronized acquisition of images are positioned on said support structure at a height comprised between 0.85 m and 0.95 m, more preferably at 0.894, the first fixed and preset inclination angle (i.e. pitch) of the optical axis with respect to the horizontal direction is comprised between +35 and +40 degrees, preferably equal to +38 degrees, and the second fixed and preset inclination angle (i.e. yaw) of the optical axis with respect to the horizontal direction is comprised between −5 and +5 degrees, preferably between −3 and +3 degrees, wherein each of said at least two of said plurality of elements for the instant and synchronized acquisition of images is mutually arranged horizontally at a given distance along the development of the support structure, which is different between one another.

The latter configuration is particularly advantageous for the acquisition and three-dimensional digital reconstruction, as well as for the subsequent automatic derivation of landmarks, anthropometric measurements, volumetric indices of parts of the body of the subject to be photographed, such as the skull, upper part of the shoulders, external part of the arms, internal part of the arms, internal part of the legs, the lower part of the thighs and the feet.

In a fully preferred way, in the integrated optical sensors of elements for the instant and synchronized acquisition of images arranged on adjacent supporting elements or vertical pillars the second fixed and preset inclination angle of the optical axis can be different.

Advantageously, the possibility of orienting the integrated optical sensors of the elements for the instant and synchronized acquisition of images according to an optical axis with a so high combination of inclination angles, whether it is the first fixed and preset inclination angle or the second fixed and preset inclination angle, allows to organize on the support structure, upon installation of the system according to the present invention, the elements for the instant and synchronized acquisition of images depending on the needs of the operator and of the application desired for the system of the invention, so as to collect the most precise information about all the different anatomical parts which characterize the external surface of the subject to be photographed.

Preferably, the integrated optical sensors of the elements for the instant and synchronized acquisition of images are photographic sensors, more preferably photographic sensors with active pixel sensors, still more preferably photographic sensors with metal-oxide-semiconductor (MOS) active pixel sensors, in a fully preferred way photographic sensors with complementary metal-oxide-semiconductor (CMOS) active pixel sensors.

According to a particular embodiment, the integrated optical sensors of the elements for the instant and synchronized acquisition of images are photographic sensors with high-resolution complementary MOS sensors (CMOS) and with a MIPI CSI interface, more precisely they are photographic sensors Omnivision OV5640 (¼" 5-megapixel CMOS sensor).

Advantageously, depending on the application modes thereof and on the operator's needs, the present system can comprise a variable and customizable number of elements for the instant and synchronized acquisition of images.

It is understood that, with respect to a system with a lower number, for example 80, of elements for the instant and synchronized acquisition of images and comprising integrated optical sensors with a high resolution, for example more than 5 megapixels, in embodiments of the present system comprising a higher number of elements for the instant and synchronized acquisition of images, but comprising integrated optical sensors with a lower resolution, which is for example equal to 5 megapixels, the operation of instant and synchronized acquisition of images determines in any case a reconstruction of a three-dimensional digital model starting from the information associated with the images in an efficient manner.

Specifically, with respect to a system with a lower number of elements for the instant and synchronized acquisition of images and comprising integrated optical sensors with a higher resolution, a system according to the present invention comprising a higher number of elements for the instant and synchronized acquisition of images, but comprising integrated optical sensors with a lower resolution, allows an even more efficient reconstruction of a three-dimensional digital model, given the higher number of available angles at which the elements for the instant and synchronized acquisition of images are positioned with respect to a given point of the subject to be photographed, for example surfaces of the body which do not develop longitudinally with respect to the above-mentioned vertical direction of the structure or which develop longitudinally or orthogonally with respect to the latter direction, but are partially darkened by other parts of the body, which are more exposed, thus solving the above-mentioned technical problem, besides without the need to rotate the subject to be photographed or vary the inclination angle of the integrated optical sensors of the elements for the instant and synchronized acquisition of images.

In a fully advantageous way, starting from a so-reconstructed three-dimensional digital model, also the subsequent automatic derivation of anatomical landmarks, anthropometric measurements, volumetric indices of parts of the body of the subject to be photographed, and/or specific body parameters might be performed in a fully efficient manner.

In a fully preferred way, each of the elements for the instant and synchronized acquisition of images comprises a memory card in which a sequence of instructions is stored, which is suitable for allowing the instant and synchronized acquisition of images.

In other words, a program of the permanent logic component or firmware type which is suitable for allowing the instant and synchronized acquisition of images is stored on the memory card.

According to a particular aspect of the system for the image acquisition of the present invention, by means of the above-mentioned unit for transmitting the information associated with the acquired images the control device is able to send commands for the execution of the instant and synchronized acquisition of images to the elements for the instant and synchronized acquisition of images.

Therefore, the unit for transmitting the information associated with the acquired images from the control device can be set up not only to wirelessly send information associated with the images acquired by the elements for the instant and synchronized acquisition of images to the control device, but it is also set up to send commands—optionally wirelessly—from the control device to the elements for the instant and synchronized acquisition of images.

Thereby, in an extremely advantageous way, the operator will be able to instruct the control device to perform the instant and synchronized acquisition of the images and the latter will instantaneously send the related command to all image acquisition devices, so that the acquisition itself occurs immediately and synchronously.

According to a particular embodiment of the system of the invention, each of the elements for the instant and synchronized acquisition of images can comprise an integrated unit for wirelessly transmitting the information associated with the acquired images and/or for receiving said commands for the instant and synchronized acquisition of images.

According to a further embodiment of the system of the invention, the above-mentioned unit for wirelessly transmitting the information associated with the acquired images is integrated with the control device.

Preferably, the control device, possibly by means of the unit for transmitting the information associated with the acquired images, can communicate with a terminal comprising an interface for the interaction with an operator; more preferably, the terminal is a PC, a totem, a palmtop, a tablet or a smartphone.

More preferably, the unit for transmitting the information associated with the acquired images and the terminal comprising an interface for the interaction with an operator are both integrated with the control device.

In a fully advantageous way, a program or an application can be installed on the terminal, which allow the operator to control the instant and synchronized acquisition of images and to display the three-dimensional digital model reconstructed by the central processing unit, as well as anatomical landmarks, anthropometric measurements, volumetric indices of parts of the body of the subject to be photographed and/or specific body parameters, which are automatically derived from the so-reconstructed three-dimensional digital model.

As an alternative, the control device can comprise an interface for the interaction with an operator and optionally for the audiovisual presentation of information.

The audiovisual presentation can be for example in the form of an automatically-generated and specific analytical report of certain anatomical landmarks, anthropometric measurements, volumetric indices of parts of the human body, specific body parameters and/or respective comparison values, as will be seen below, wherein this analytical report is available to the operator, such as a physician, a surgeon, a dentist or a prosthodontist, for subsequent evaluations.

Preferably, the control device is a computer on which a program or an application can be advantageously installed for allowing the operator to control the instant and synchronized acquisition of images and to display the three-dimensional digital model reconstructed by the central processing unit, as well as anatomical landmarks, anthropometric measurements, volumetric indices of parts of the body of the subject to be photographed and/or specific body parameters which are automatically derived from the so-reconstructed three-dimensional digital model.

In a fully general way, the above-mentioned terminal comprising an interface for the interaction with an operator and/or the computer can be advantageously equipped with a local processing capacity which is able to manage the processing interactive part (for example, the management of a part of data and/or information with the operator) lightening the information load to be processed in the central processing unit.

In a fully preferred way, the above-mentioned central processing unit can be wirelessly connected to the control device through a WLAN/LAN network.

As an alternative, the control device and the central processing unit are integrated in a single device.

According to a still alternative embodiment, the central processing unit can be connected to the control device through a WAN (Wide Area Network) network, for example by means of at least one modem and/or router.

According to the latter embodiment, the central processing unit can be advantageously located in a distant position with respect to the plurality of devices, to the unit for transmitting the information associated with the acquired images and to the control device.

Preferably, the central processing unit can comprise a control unit, wherein the control unit comprises at least one calculation unit for the reconstruction of a three-dimensional digital model starting from the information associated with the acquired images.

More preferably, the at least one calculation unit is able to automatically derive from the three-dimensional digital model anatomical landmarks, anthropometric measurements, volumetric indices of parts of the body of the subject to be photographed and/or specific body parameters.

Therefore, very advantageously, thanks to the peculiar features thereof, with particular reference to the elements for the instant and synchronized acquisition of images, in particular to their type, number and distribution on the support structure, the system according to the present invention allows first to perform a scanning of the photogrammetric type by means of the elements for the instant and synchronized acquisition of images and, after sending and processing the information associated with the so-acquired images by digitizing the anatomical shapes of the so-photographed subject with an accuracy in the order of one millimeter, it allows to derive automatically and in a particularly efficient manner anatomical landmarks, anthropometric measurements, volumetric indices of parts of the body of the subject to be photographed and/or specific body parameters from a properly-reconstructed three-dimensional digital model.

In particular, it is possible to obtain volumetric indices of even relatively small parts of the body of the subject to be photographed, in the order of 1 mm$^3$.

In other words, the system according to the present invention allows the above technical problem to be effectively solved and it allows in particular to automatically perform first the procedure of instant and synchronized acquisition of images, then sending information associated therewith and finally the reconstruction of a three-dimensional digital model, as well as the automatic derivation therefrom of anatomical landmarks, anthropometric measurements, volumetric indices of parts of the body of the subject to be photographed and/or specific body parameters from this three-dimensional digital model, efficiently reconstructing also small, so to speak, portions of the human body, whose volume is an important morphological indicator, wherein all these operations are usually performed in a more rudimentary, so to speak, manner with reference to the systems on the market with reference to the prior art.

According to a preferred embodiment of the system according to the invention, the central processing unit can preferably comprise at least one memory unit which is set up to store the three-dimensional digital model and/or anatomical landmarks, anthropometric measurements, volumetric indices of parts of the body of the subject to be photographed and/or specific body parameters.

More preferably, the memory unit can comprise at least one database which is set up to store and/or on which corresponding standard normal values of anatomical landmarks, anthropometric measurements, volumetric indices of parts of the human body and/or specific body parameters are stored.

More preferably, three-dimensional models, anatomical landmarks, anthropometric measurements, volumetric indices of parts of the body of the subject to be photographed and/or specific body parameters which are automatically derived on occasion of previously performed acquisitions of images of the subject to be photographed are stored on the at least one database.

In particular, pursuant to the present invention, the expression "standard normal values" means values of anatomical landmarks, anthropometric measurements, volumetric indices of parts of the human body and/or specific body parameters which are available in scientific literature, for example in anatomy manuals, and/or obtainable on public databases.

Consistently, the above database can be periodically updated so as to comprise standard normal values of anatomical landmarks, anthropometric measurements, volumetric indices of parts of the human body and/or specific body parameters which are consistent with corresponding standard normal values updated according to the most recent scientific literature.

In a fully preferred way, the central processing unit can comprise evaluation means which are set up to compare the above-mentioned anatomical landmarks, anthropometric measurements, volumetric indices of parts of the body of the subject to be photographed and/or the specific body parameters which are automatically derived from the three-dimensional digital model with the corresponding standard normal values stored in said at least one database.

In other words, the present invention provides a system which is able to acquire instantaneously and in a synchronized manner images of a subject to be photographed, transmit information associated therewith, optionally wirelessly, and automatically reconstruct a three-dimensional digital model of anatomical shapes of the subject to be photographed, specifically by photogrammetry, by means of a central processing unit, which is in particular not necessarily located at the site of installation of the elements for the instant and synchronized acquisition of images, of the support structure to which they are anchored, of the control device of the at least one unit for transmitting the information associated with the acquired images.

According to a preferred operating mode of the present system, the central processing unit is located at a different site with respect to the site where the remaining unit of the system of the invention are installed.

The latter possibility advantageously allows a better and more centralized management of the information relating to the acquired images, as well as a greater calculation efficiency and power in the reconstruction of the three-dimensional digital model of the photographed subject, in the calculation of anatomical landmarks, anthropometric measurements, volumetric indices of parts of the body of the subject to be photographed and/or specific body parameters which are automatically derived and in the comparison between the latter ones with standard normal values.

In fact, according to this mode, it is not necessary to install complex software for the reconstruction of the three-dimensional digital model for example on a computer at the image acquisition site, determining a simplification from the point of view of the installation both of the system hardware components the at the image acquisition site, and of the software required for the use of the system hardware components, as well as for the technical assistance during possible malfunctions of the central processing unit.

Moreover, it must be said that the database of the present system allows therefore to store standard normal values and/or anatomical landmarks, anthropometric measurements, volumetric indices of parts of the body of the subject to be photographed and/or specific body parameters which are automatically derived on occasion of previously performed acquisitions of images of the subject to be photographed, and to compare, by means of the calculation unit of the system, these values with anatomical landmarks, anthropometric measurements, volumetric indices of parts of the body of the subject to be photographed and/or specific body parameters which are automatically derived from the three-dimensional digital model.

Therefore the operator, as will be seen below in connection with the process according to the present invention, might advantageously have at its disposal, not only three-dimensional models, anatomical landmarks, anthropometric measurements, volumetric indices of parts of the body of the subject to be photographed and/or specific body parameters which are automatically derived from the three-dimensional digital model, but also resulting comparison values, which are useful for subsequent evaluations.

In particular, the anatomical landmarks, anthropometric measurements, volumetric indices of parts of the body of the subject to be photographed and/or specific body parameters which are automatically derived from the three-dimensional digital model, as well as the resulting comparison values, might be useful for evaluations, in particular, in the medical field, for example in manufacturing prosthesis or corrective aids, in verifying and/or monitoring posture, in verifying and/or monitoring functional variations of the spine and skull, in mapping skin nevi and/or other skin phenomena.

Moreover, the present invention provides information and tools which are particularly useful for the specialized doctor in the field of diagnoses and/or evaluations of pathologic conditions and/or conformational anomalies, especially in disorders of the spline, like kyphosis, lordosis and scoliosis, of the skull, like plagiocephaly, as well as of the skin, like disorders associated with skin phenomena (for example, rash) and/or in the evaluation of burns of the skin.

Moreover, the present invention provides information and tools which are particularly useful for the specialized doctor or surgeon, for the dentist or the prosthodontist, in the field of physician, surgical or dental pre- and post-treatment evaluations.

Another field of use of the system according to the present invention is the beauty field, for example in the detection of imperfections, stains and/or skin pigmentation or aging or in monitoring the body mass, especially in the field of beauty treatments of weight loss, diets or programs for weight loss, strengthening or physical training, as well as in the field of monitoring hair loss and/or the desired coverage of the skin with fur and/or hair.

The present system can also be used in the field of sports or workplace safety, for example for the provision of appropriate personal protection devices, of textile and clothing, of diving, and/or in the aeronautical or aerospace field, for example for the provision of appropriate overalls or suits, which are even customized.

In accordance with the present invention, the above-mentioned technical problem is also solved by a process for the image acquisition and three-dimensional digital reconstruction of human anatomical shapes which can be performed by means of any of the embodiments of the system of the invention.

The process of the invention comprises the following steps:
acquiring instantaneously and in a synchronized manner images of a subject to be photographed;
transmitting, optionally wirelessly, information associated with the so-acquired images;
reconstructing a three-dimensional digital model of anatomical shapes of said subject to be photographed starting from the information associated with the acquired and transmitted images,
wherein the step of reconstructing a three-dimensional digital model is performed by photogrammetry.

More preferably, the process for the image acquisition and three-dimensional digital reconstruction of human anatomical shapes according to the invention comprises the following further steps:
automatically deriving anatomical landmarks, anthropometric measurements, volumetric indices of parts of the body of the subject to be photographed and/or specific body parameters from said three-dimensional digital model;
optionally, comparing the anatomical landmarks, anthropometric measurements, volumetric indices of parts of the body of the subject to be photographed and/or specific body parameters which are automatically derived from the three-dimensional digital model with corresponding standard normal values and/or with anatomical landmarks, anthropometric measurements, volumetric indices of parts of the body of the subject to be photographed and/or specific body parameters which are automatically derived on occasion of previously performed acquisitions of images of the subject to be photographed, obtaining respective comparison values.

More preferably, the specific body parameters which are automatically derived from the three-dimensional digital model refer to the conformation of the back, trunk, limbs and/or skull of the so-photographed subject to be photographed, and the standard normal values refer to the conformation of the back, trunk, limbs and/or skull in human beings.

In a fully preferred way, the process according to the invention comprises the further step of providing an operator with said three-dimensional digital model and/or said anatomical landmarks, anthropometric measurements, volumetric indices of parts of the human body, specific body parameters and/or said respective comparison values, preferably through an audio-visual presentation.

The audio-visual presentation can, for example, be in the form of an automatically-generated and specific analytical report of certain anatomical landmarks, anthropometric measurements, volumetric indices of parts of the human body, specific body parameters and/or said respective comparison values, wherein the analytical report is available to the operator, such as a physician, a surgeon, a dentist or a prosthodontist, for subsequent evaluations.

Therefore, in accordance with a preferred embodiment of the present process, through the reconstruction of the three-dimensional digital model, the operator can advantageously evaluate the conformation of the back, trunk, limbs and/or skull of the so photographed subject, also in connection with so-stored standard normal values.

The features and advantages of the system for the image acquisition and three-dimensional digital reconstruction of human anatomical shapes according to the invention will be apparent from the following detailed description and embodiments thereof given by way of non-limiting examples with reference to the attached drawings.

BRIEF DESCRIPTION OF THE DRAWINGS

FIG. 4a represents a table comprising the typical lengths of some representative body segments as a function of the sex, man (U) and woman (D), and of the anthropometric features of a subject to be photographed corresponding to the $3^{rd}$ percentile ($3^{rd}$ p), $50^{th}$ percentile ($50^{th}$ p) and $97^{th}$ percentile ($97^{th}$ p) for subjects aged over 20 years, as well as the diameters of ideal cylinders in which said parts of the body are inscribed.

FIG. 5 represents a table comprising information about the elements for the instant and synchronized acquisition of images which are present in an alternative embodiment of the system according to the invention, providing in particular information about the distribution thereof on the support structure and about the orientation of the first and second inclination angles of the optical axis of the optical sensors integrated therein.

DETAILED DESCRIPTION OF PREFERRED EMBODIMENTS

Figure 1:
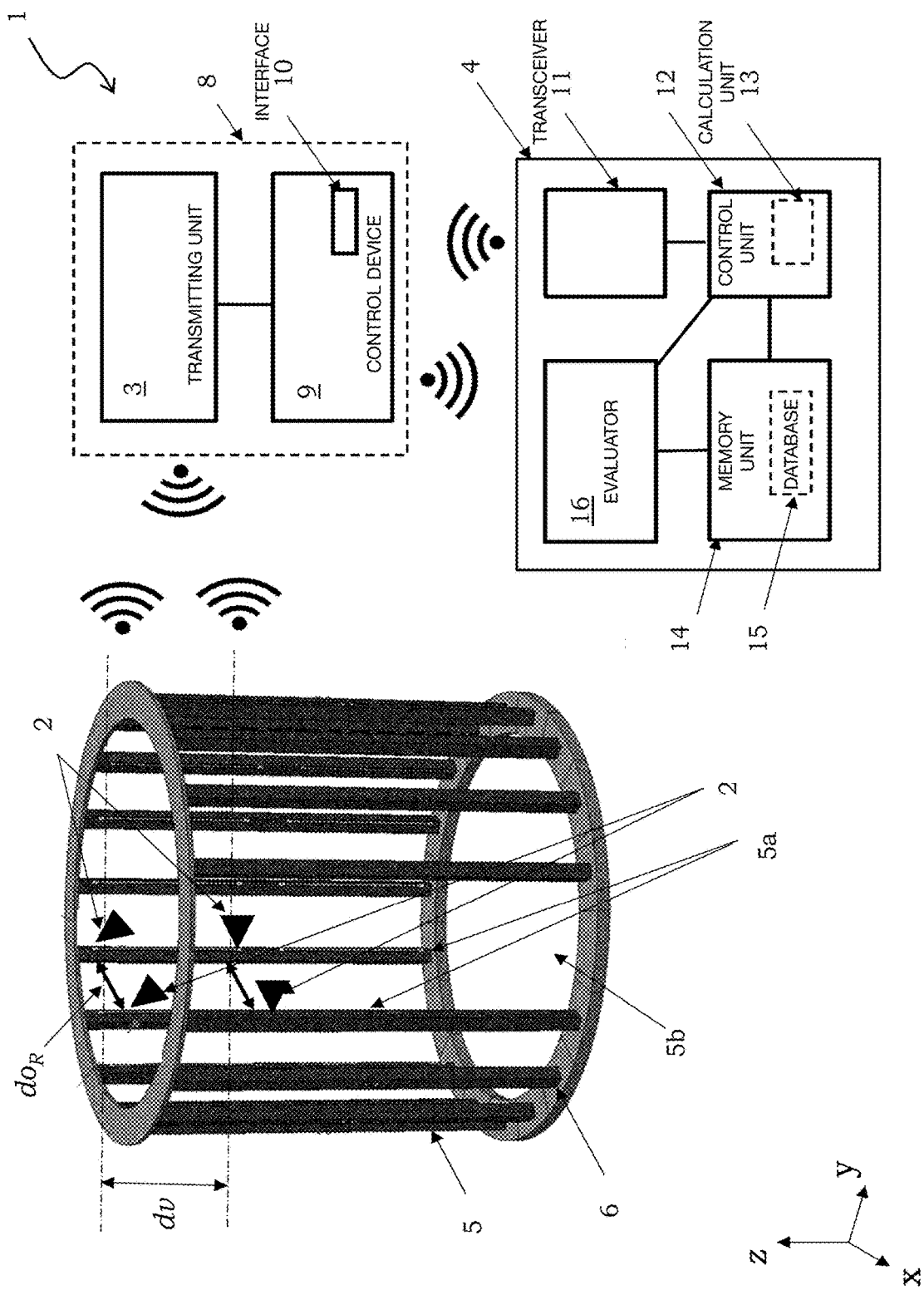
FIG. 1 schematically represents a first preferred embodiment of the system according to the present invention.

A system 1 for the image acquisition and three-dimensional digital reconstruction of human anatomical shapes, in accordance with a preferred embodiment of the present invention, is shown in FIG. 1.

The system 1 comprises first of all a plurality of elements 2 for the instant and synchronized acquisition of images and for wirelessly sending information associated with the acquired images.

As can be noted, only four out of a total of one hundred thirty-six (or one hundred forty-four according to a different configuration) elements 2 for the instant and synchronized acquisition of images are shown in FIG. 1.

The elements 2 for the instant and synchronized acquisition of images are fixedly anchored to a support structure 5, for example anchored through proper screwing or hooking means to proper supporting elements 5a of the support structure 5.

The supporting elements 5a essentially consist of pillars made of metal and/or plastic material.

In the embodiment illustrated in the Figure, a total number of seventeen vertical pillars or supporting elements 5a is present, a number which is equal to eight elements 2 for the instant and synchronized acquisition of images being fixedly anchored on each of them, depending on the vertical pillar.

The support structure 5 has a development 6 which is suitable for surrounding a subject to be photographed.

The development 6 has a substantially circular shape and the supporting elements 5a are properly arranged along the development 6 so as to surround the subject to be photographed as completely as possible, that is so that the assembly of the images acquired by the elements 2 for the instant and synchronized acquisition of images anchored to the supporting elements 5a can be used to reproduce the entirety of the subject to be photographed, comprising the body areas for which image acquisition is more difficult.

The subject to be photographed will have the room to comfortably rest in the center of the support structure 5.

In particular, the subject to be photographed might position in the center of the support structure 5 by passing through an opening 5b made therein and placed between two consecutive supporting elements 5a.

The subject to be photographed might possibly keep a standing position upon acquisition of the image.

In particular, the subject to be photographed might keep a so-called standard posture, according to the ISO 20685-1:2018 regulation, in which the subject to be photographed is in the standing position with the head looking forward, the feet are parallel to the shoulders, the shoulder joints are abducted at about 200 with respect to the sides of the torso and the elbows are slightly flexed, the palms of the hands face each other.

Figure 2:
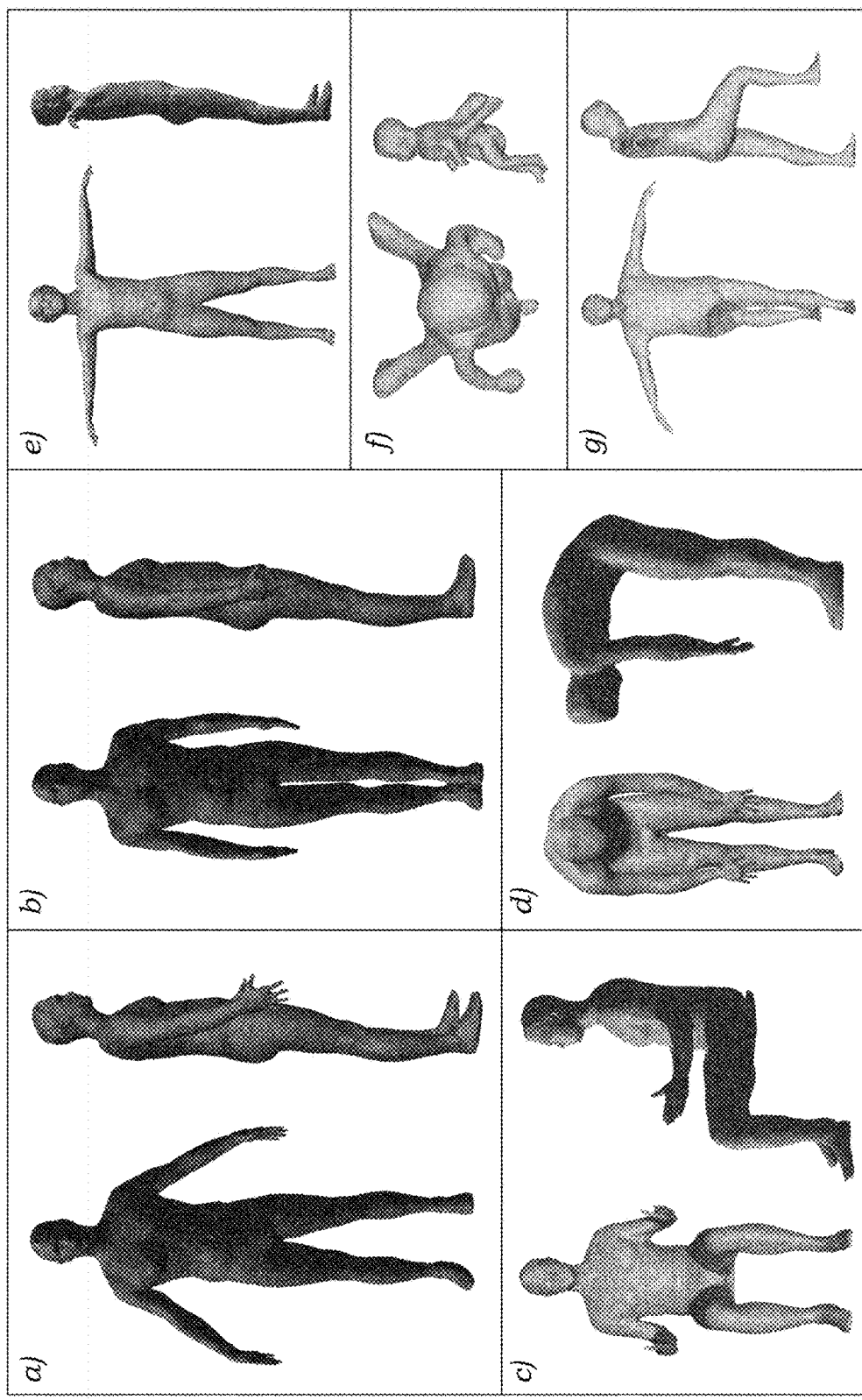
FIG. 2 illustrates some three-dimensional models reconstructed by means of the system of the present invention of a subject to be photographed according to different postures, each shown in a different image a) to g).

See FIG. 2, image a), which shows a three-dimensional reconstructed model for image acquisition of a so-photographed subject.

The subject to be photographed might alternatively keep a posture which is different from the standard one, for example the so-called "relaxed" posture of FIG. 2, image b), upon acquisition of the image.

An exemplary illustration of the posture and of other postures, such as "sitting", "Adams", "T-pose", "Skull-pose" and "AFO-pose", is shown in FIG. 2 and particularly in images c) to g), respectively.

The elements 2 for the instant and synchronized acquisition of images, fixedly anchored to the support structure 5, are mutually arranged vertically at preset heights.

The relative distance in the vertical dimension between the centers of two integrated optical sensors of two vertically adjacent elements 2 for the instant and synchronized acquisition of images is indicated with dvi.

The elements 2 for the instant and synchronized acquisition of images are also mutually arranged at a given distance $do_R$ along the development 6 of the support structure 5.

Generally speaking, in the system 1 according to the present invention it is provided that elements 2 for the instant and synchronized acquisition of images which are horizontally adjacent and placed at the same preset height have a given distance $do_R$ that is a predetermined distance.

Similarly, elements 2 for the instant and synchronized acquisition of images which are vertically adjacent, that is vertically aligned, specifically on the same supporting element 5a, have different preset heights.

In particular, in the present embodiment the elements 2 for the instant and synchronized acquisition of images were distributed and installed on the support structure so as to allow a correct image acquisition which is particularly faithful to the anatomical shapes of the subject to be photographed in the bone areas of the trunk, legs and feet.

In other words, returning to the embodiment illustrated in FIG. 1, eight elements 2 for the instant and synchronized acquisition of images are anchored on each supporting element 5a, arranged at eight different preset heights and equidistantly distributed from each other along each supporting element 5a.

Although not represented in the Figure for ease of illustration, the system 1 therefore comprises, positioned on seventeen different supporting elements 5a, eight elements 2 for the instant and synchronized acquisition of images for each of the above-mentioned different eight preset heights and, precisely, for a total of one hundred thirty-six (or one hundred forty-four according to an different configuration) elements 2 for the instant and synchronized acquisition of images.

The position and orientation of the elements 2 for the instant and synchronized acquisition of images which comprise integrated optical sensors are defined by the following variables (see FIG. 3a):
number of photographic sensors to be arranged in the vertical direction on each vertical pillar ncv;
distance in the vertical direction between the centers of two adjacent photographic sensors dv;
vertical height from the walking plane of the first photographical sensor positioned on the vertical pillar h;
first inclination angle of the optical axis of the photographical sensor in the lateral direction thereof, corresponding to the so-called pitch δ;
second inclination angle of the optical axis of the photographical sensor around the normal direction of the plane of the photographical sensor, corresponding to the so-called yaw ε.

The elements 2 for the instant and synchronized acquisition of images comprise integrated optical sensors, whose optical axis has a first inclination angle, corresponding to the so-called pitch, as well as a second inclination angle, corresponding to the so-called yaw, being equal to zero.

Figure 3A:
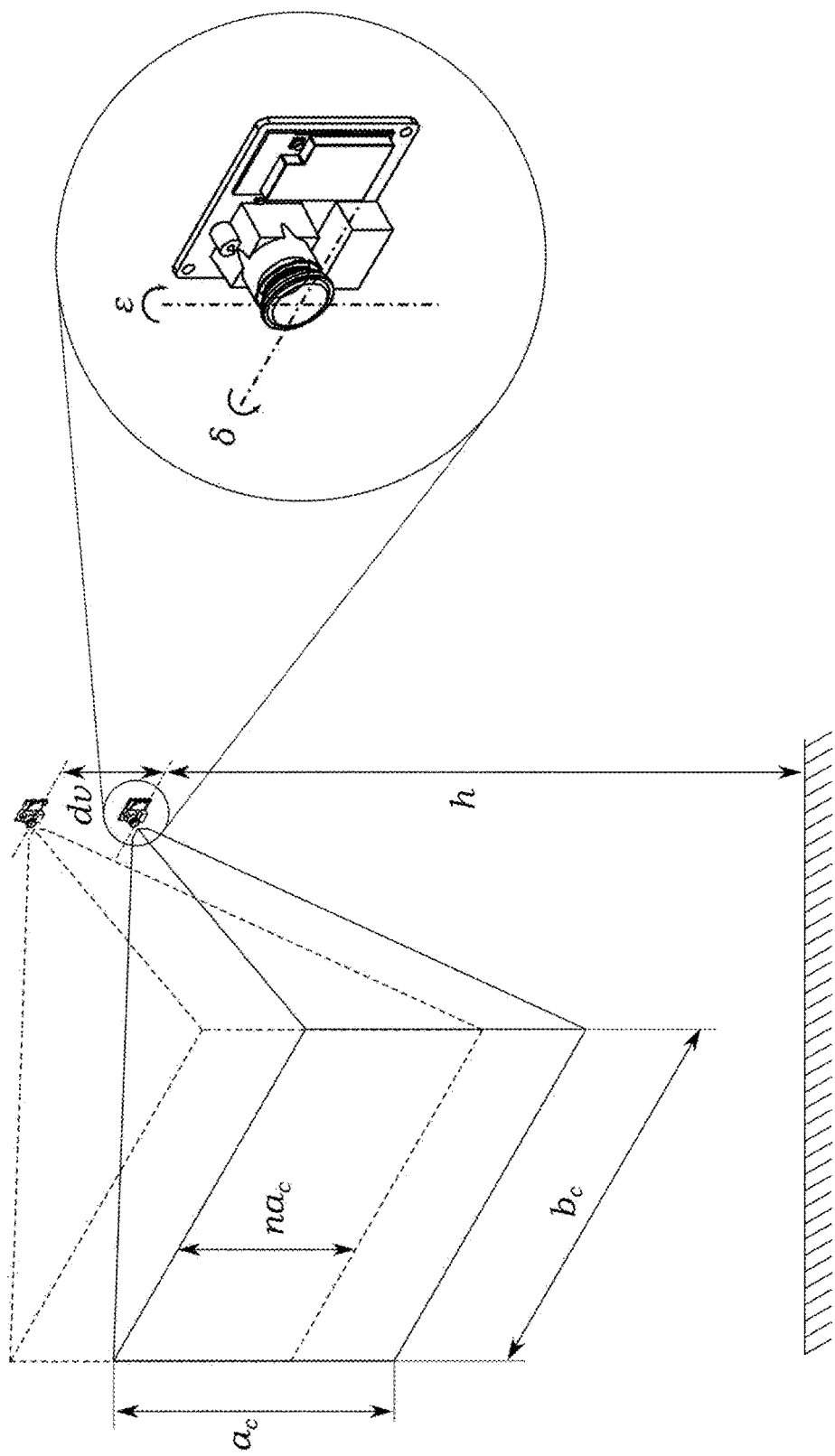
FIG. 3a illustrates projection pyramids of the integrated optical sensors in a pair of elements for the instant and synchronized acquisition of images of the system according to the present invention, as well as the quantities used to position the elements in the space and the indication of the reference axes of the elements.
Figure 4B:
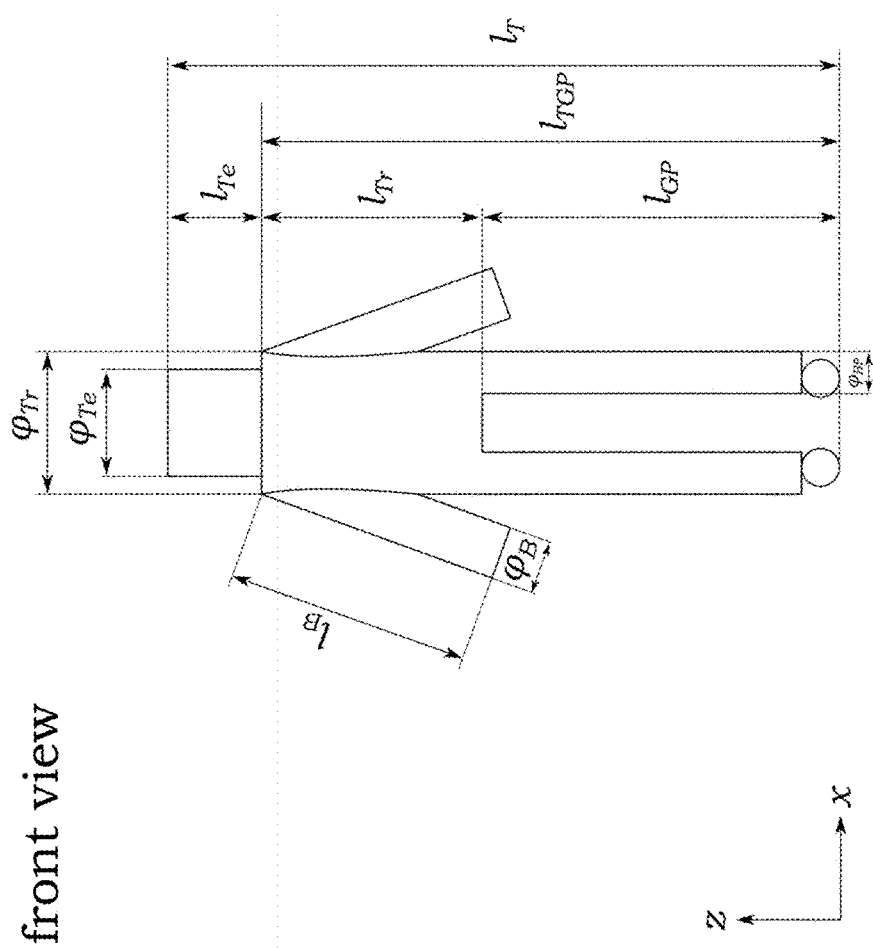
FIG. 4b includes a schematization of the human body by means of cylinders, used for the optimal arrangement of the devices for the instant and synchronized acquisition of images around the human body.

The number of integrated optical sensors to be arranged in the vertical direction ncv along each supporting element 5a is given by the following relationship I:

$$ncv = \text{round}\left(\frac{l}{(1-n)a_c}\right); \quad (I)$$

where
round (•) is the function which approximates a decimal number to the closest integer;
l is the height of a cylinder which is representative of the trunk, in this case, or of the specific part of the body, more generally, of the subject to be photographed, the trunk being ideally inscribable in the cylinder, and where l is based on the height percentiles of the trunk, in this case, or of the specific part of the body, more generally, of the subjects to be photographed; in particular, according to the present embodiment, it is based on the $97^{th}$ percentile of the height of the trunk of male individuals of the table of FIG. 4a;
$a_c$ is the height of the rectangle described by the projection pyramid of the optical sensor integrated in the elements 2 for the instant and synchronized acquisition of images on the plane which is tangent to the cylinder which is representative of the trunk of the subject to be photographed, in the point in which the optical axis of the integrated optical sensor intersects the cylinder; in the case of this embodiment ($a_c$=524 mm) (see specifically the exemplification represented in FIG. 3a);
n is a dimensionless value comprised between 0 and 1 corresponding to an overlapping index between two above projection rectangles for two adjacent elements 2 for the instant and synchronized acquisition of images in the horizontal direction.

Preferably and with reference to the present embodiment, in the system according to the present invention the value n is equal to 0.6 that is, as illustrated in FIG. 3a, two projection rectangles of elements 2 for the instant and synchronized acquisition of images which are adjacent in the vertical direction have an overlap of 60%.

Advantageously, being n equal to 0.6, the system according to the present invention has allowed a correct image acquisition and a subsequent particularly robust and accurate reconstruction of a three-dimensional digital model.

The distance in the vertical direction dv between the center of two integrated optical sensors of two vertically adjacent elements 2 for the instant and synchronized acquisition of images dv is given by the following relationship (II):

$$dv = \frac{l}{ncv} \quad II$$

where ncv and l are as previously defined with reference to the relationship I.

Specifically, reference was made to a single cylinder in which the parts of the body called trunk, legs and feet were inscribed; the diameter of the cylinder being considered was deemed equal to 400 mm, this diameter corresponding to the diameter of the trunk quoted in table of FIG. 4a.

By inserting in the above relationship I the value $l=l_{TGP,U97}$ (length of the cylinder of the trunk-leg-foot of the male subject, $97^{th}$ percentile, see the table of FIG. 4), a number ncv was obtained which is equal to eight elements 2 for the automatic and synchronized acquisition of images to be arranged along each supporting element 5a and in the vertical direction.

The number of elements 2 for the automatic and synchronized acquisition of images is sufficient to ensure an efficient image acquisition, sufficient to reconstruct a three-dimensional digital model of a male or female subject to be photographed, whose body dimensions fall within any percentile.

The relative vertical distance of the photographic sensors dv is obtained by inserting in the relationship II the value $l=l_{TGP,U97}$, that is in numerical terms dv=202 mm.

Specifically, the preset height from the walking plane of the first level of elements 2 for the automatic and synchronized acquisition of images h is set equal to 256 mm.

With reference to FIG. 3a, which represents the rectangle described by the projection pyramid of the optical sensor integrated in the elements 2 for the instant and synchronized acquisition of images on the plane which is tangent to the cylinder which is representative of the trunk of the subject to be photographed, the rectangle described by the projection pyramid of the integrated optical sensor has, in the vertical direction, a height $a_c$ which is equal to 524 mm, in the horizontal direction, a length $b_c$ which is equal to 717 mm, respectively.

Gradually from the first to the eighth level, the elements 2 for the automatic and synchronized acquisition of images were thus arranged and installed according to a circular distribution on the support structure 5, having a circumference of radius r which is equal to 1200 mm, so as to ensure a minimum focal distance between the photographical sensor and the human body of 1000 mm (considering the diameter body equal to 400 mm, a radius of the circumference with a value which is equal to 1200 mm is indeed obtained).

The circular repetition angle β was set equal to 20 degrees.

Figure 3B:
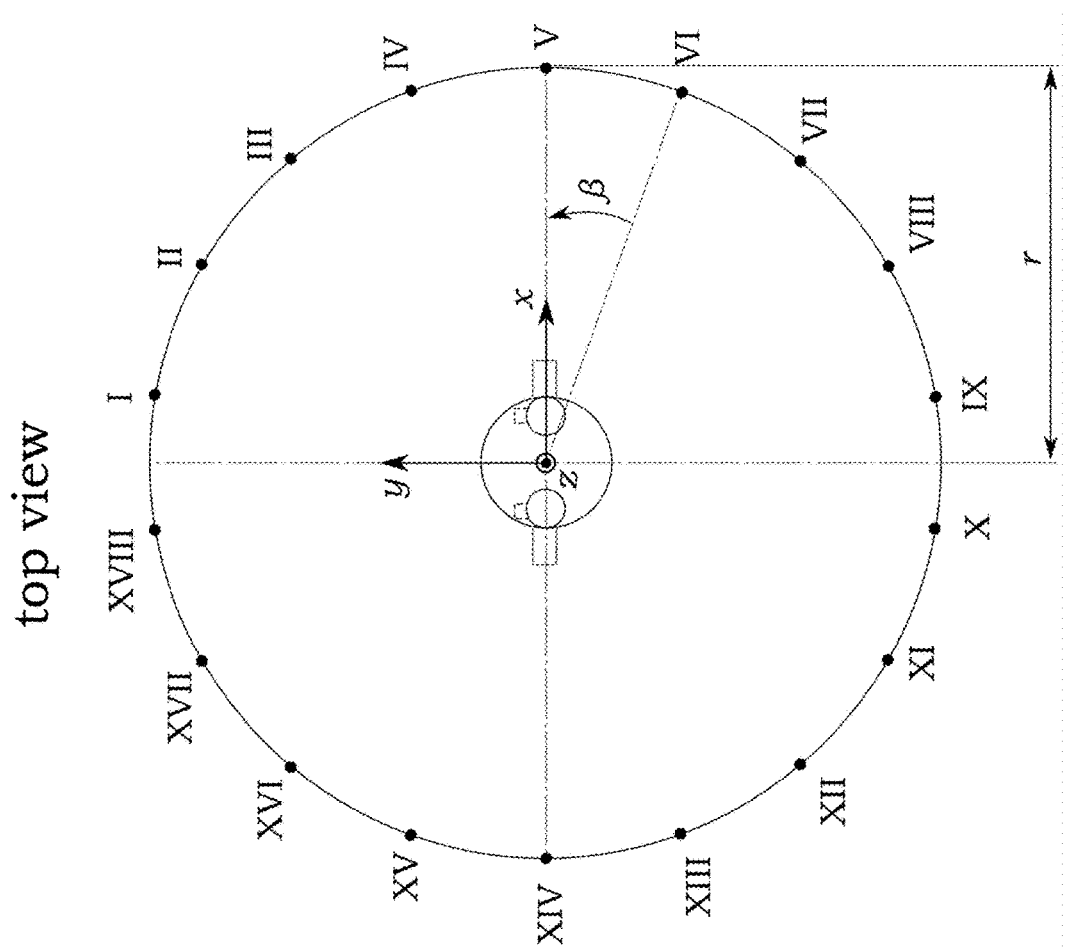
FIG. 3b shows a schematic top view of the support structure of the system of the second embodiment, in which the supporting elements or vertical pillars are identified with roman numerals.

According to an embodiment of the present invention, considering a circular repetition angle β equal to 20 degrees, there is on the circumference a number of vertical pillars which is equal to eighteen; considering that the number of photographic sensors provided for each vertical pillar is equal to eight, it theoretically results a number of photographic sensors of the system which is equal to one hundred forty-four. Nevertheless, in a constructive embodiment, the vertical pillar number V (FIG. 3b) was removed and leaves room to an entry opening, the number of one hundred thirty-six photographic sensors is thus obtained, which is equal to eight photographic sensors for seventeen vertical pillars. In FIG. 3b a top view of the support structure is schematically shown, to which the elements for the instant and synchronized acquisition of images of the present embodiment are anchored, comprising the nomenclature of the vertical pillars, the indication of the circular repetition angle and the radius of the device. Specifically, each roman number I to XVII corresponds to a support element or vertical pillar on which the elements for the instant and synchronized acquisition of images are arranged.

The distribution of the elements 2 for the instant and synchronized acquisition of images, as well as the specific orientation of the optical axis of the optical sensors integrated therein, as will be seen below, allowed to acquire enough images for the reconstruction of a three-dimensional model of the human body of the subject to be photographed in the entirety thereof.

Indeed, according to this embodiment of the present invention, the center of the highest photographical sensor in each vertical pillar is at a height which is equal to 1670 mm (256+7·202 mm); by adding to this number the part of the height of the rectangle of the last photographical sensor (0.4·$a_c$), a global acquisition height which is equal to 1880 mm is obtained, which is equal to the total height of the highest percentile (man, $97^{th}$ percentile). Indeed, the vertical height from the walking plane of the first photographical sensor starting from the walking plane (equal to 256 mm) was determined by considering this aspect.

In particular, thanks to the so-arranged distribution of the devices on the support structure, as well as thanks to the specific orientation of the optical axis of the optical sensors integrated therein, the system according to the present invention allows a correct image acquisition and the subsequent reconstruction of a three-dimensional model, keeping each device fixedly anchored to the support structure, that is without the need to vary the orientation of the optical axis of the optical sensors integrated therein, allowing the acquisition of any human subject to be photographed.

The integrated optical sensors of the elements 2 for the instant and synchronized acquisition of images are photographic sensors, in particular photographic sensors of the Omnivision OV5640 ¼" color CMOS QSXGA 5 megapixel image sensor type with OmniBSI.

As it is evident from FIG. 1, the system 1 according to the present invention also comprises a central processing unit 4 for the automatic reconstruction of a three-dimensional digital model starting from the information associated with the images acquired by the elements 2 for the instant and synchronized acquisition of images, a control device 9 which is able to transmit the information associated with the so-acquired images to the central processing unit 4 and/or to receive information relating to the three-dimensional digital model.

Moreover, the system 1 comprises at least one unit 3 for wirelessly transmitting the information associated with the acquired images, coming from the plurality of elements 2 for the instant and synchronized acquisition of images, towards the control device 9.

Specifically, the control device 9 and the unit 3 for wirelessly transmitting information are integrated in a single device 8.

The unit 3 is indeed connected with the control device 9 and it can communicate with the central processing unit 4 through a WAN network, that is by means of at least one modem and/or router, positioned onsite, not illustrated since it is fully conventional and however not comprised in the present system.

In particular, the modem and/or router can be a conventional modem for ADSL connection, for example through optical fibre, and able to communicate with the control device 9 and with the central processing unit 4 through a dedicated network.

The unit 3 can be alternatively connected with the control device 9 and it can communicate with the central processing unit through an autonomous wireless network, for example a 4G or 5G mobile network.

According to this particular embodiment of the system according to the present invention, the autonomous wireless network makes the system 1 of the invention independent from an existing WiFi network, for example a public or corporate network, and thus allows the system not to suffer from possible anomalies of the existing WiFi network which would jeopardise the operation thereof.

According to the latter embodiment, the central processing unit 4 can advantageously be located in a distant position with respect to the plurality of elements 2 for the instant and synchronized acquisition of images, to the transmission unit 3 and to the control device 9.

Moreover, by means of the unit 3 for wirelessly transmitting information associated with the acquired images the control device 9 is able to send commands for the execution of the instant and synchronized acquisition of images to the elements 2 for the instant and synchronized acquisition of images.

The control device 9 comprises in fact an interface 10 for the interaction with an operator, which can arrange for sending a shoot command to the elements 2 for the instant and synchronized acquisition of images. Accordingly, the unit 3 for wirelessly transmitting information associated with the acquired images is able to send commands for the execution of the instant and synchronized acquisition of images to the elements 2.

The control device 9 is also able to receive data processed by the central processing unit 4 and relating to the information associated with the images so acquired by the elements 2 for the instant and synchronized acquisition of images.

In a fully advantageous way, by means of the system 1 according to the present invention it is possible to acquire instantaneously and in a synchronized manner images of a subject to be photographed, therefore without the aid of systems which provide for the rotation of the image acquisition devices and without them varying the inclination angle thereof with respect to the subject to be photographed, and then to have a sufficient number of information for effectively reconstructing a three-dimensional digital model of the so-photographed subject.

Specifically, the interface 10 is suitable for the audiovisual presentation of information, for example through a touch screen.

In particular, each of the elements 2 for the instant and synchronized acquisition of images also comprises an integrated unit for wirelessly transmitting the information associated with the acquired images and/or for receiving commands for the instant and synchronized acquisition of images.

More particularly the integrated unit for wirelessly transmitting information is set up to communicate, by means of the transmission unit 3, with the control device 9.

Specifically, the wireless transmission unit integrated in each of the elements 2 for the instant and synchronized acquisition of images is a WiFi module, more specifically a WiFi 802.11 module with integrated antenna.

Moreover, each of the elements 2 for the instant and synchronized acquisition of images comprises an integrated circuit of the Soc or System on chip type, in particular an integrated circuit of the ESP32 family.

More specifically, the elements 2 for the instant and synchronized acquisition of images further comprise an interface between the photographical sensor and the integrated circuit of the Soc type, for example a CSI interface.

Consistently, the elements 2 for the instant and synchronized acquisition of images comprise means for the synchronous image acquisition, in particular a terminal board for the synchronous shoot digital signal sent by the control device 9.

In fact, in a completely advantageous manner, the system 1 according to the present invention allows an instant and synchronous shoot to be performed with immediate image acquisition of the subject to be photographed by all the elements 2 for the instant and synchronized acquisition of images.

The elements 2 for the instant and synchronized acquisition of images also comprise a terminal board for the connection to LED lighting devices and to external projectors.

In fact, although not illustrated in FIG. 1 since they are fully conventional, the system 1 according to the present invention can comprise lighting devices, for example LED lighting devices, as well as external projectors.

The lighting devices are arranged on supporting elements 5a and have the function of lighting the area where the subject will stay, as well as the subject itself, in order to improve the quality of the images to be acquired by means of the elements 2 for the instant and synchronized acquisition of images and, accordingly, the global quality of the so-reconstructed three-dimensional digital model.

In particular, the LED lighting devices are distributed along the whole length of supporting elements 5a. As an alternative, the LED lighting devices can be positioned above the support structure 5 so as to light the area arranged for the subject to rest.

Advantageously, a three-dimensional digital model with a better quality of the colours, that is of the skin surface, can thus be obtained.

Similarly, in a fully general way, the system 1 according to the present invention can comprise external projectors, for example typical pattern projectors, which are useful to improve the quality of the reconstructed three-dimensional digital model (specifically, in greyscale).

Advantageously, the system 1 according to the present invention can perform the image acquisition operation once the external projectors and the lighting devices are turned on.

In a fully optional way, according to a particular application mode thereof, the system 1 according to the present invention can perform a first image acquisition operation when the lighting devices are turned off and, immediately after, a second image acquisition operation when the lighting devices are turned on.

In other words, pursuant to the present invention, the elements 2 for the instant and synchronized acquisition of images, by means of the optical sensors integrated therein, can operate at least according to four operating modes among which a first mode provides for a synchronized single shoot, a second mode provides for a synchronized single shoot after turning the lighting devices on, a third mode provides for a synchronized single shoot after turning the external projectors on and a fourth mode provides for a double synchronous shoot, in which the first shoot is performed after turning the external projectors on and the second one is performed after turning the lighting devices on.

Advantageously, the operating modes which provide for the lighting devices to be turned on are particularly suited for beauty applications, while the operating modes which provide for the external projectors to be turned on are particularly suited for orthopaedic and physiatry applications.

Moreover, in accordance with the particular embodiment illustrated in FIG. 1, the central processing unit 4 comprises at least one transceiver 11 which is suitable for receiving from and/or transmitting signals towards the control device 9 and towards the unit 3 for transmitting information.

As it is evident, the central processing unit 4 also comprises a control unit 12, which comprises at least one calculation unit 13 which is suitable for the reconstruction of a three-dimensional digital model starting from the information associated with the acquired images.

In particular, the calculation unit 13 comprises in turn algorithms which allow to automatically derive from said three-dimensional digital model landmarks, anthropometric measurements, volumetric indices of parts of the body of the subject to be photographed and/or specific body parameters.

The control unit 12 is able to dialogue with the transceiver 11 in order to be able to manage the information associated with the acquired images and coming from the control device 9.

The calculation unit 13 allows to reconstruct the digital model and to automatically derive therefrom anatomical landmarks, anthropometric measurements, volumetric indices of parts of the body of the subject to be photographed and/or specific body parameters.

Moreover, the central processing unit 4 comprises at least one memory unit 14 which is set up to store the three-dimensional digital model and/or the anatomical landmarks, anthropometric measurements, volumetric indices of parts of the body of the subject to be photographed and/or specific body parameters.

The memory unit 14 comprises in turn at least one database 15 which is set up to store corresponding standard normal values of said anatomical landmarks, anthropometric measurements, volumetric indices of parts of the body of the subject to be photographed and/or specific body parameters and/or anatomical landmarks, anthropometric measurements, volumetric indices of parts of the body of the subject to be photographed and/or specific body parameters which are automatically derived on occasion of previously performed acquisitions of images of the subject to be photographed.

In a fully conventional manner, the database 15 comprises protection means, not represented, which are suitable for ensuring a safe and protected management of data stored therein (for example, in compliance with the HIPAA/HITECH certification).

Finally, the central processing unit 4 comprises evaluation means 16 which are set up to compare the landmarks, anthropometric measurements, volumetric indices of parts of the body of the subject to be photographed and/or the specific body parameters which are automatically derived from the three-dimensional digital model with the corresponding standard normal values and/or with anatomical landmarks, anthropometric measurements, volumetric indices of parts of the body of the subject to be photographed and/or specific body parameters which are automatically derived on occasion of previously performed acquisitions of images of the subject to be photographed, stored in the database 15.

In other words, the present invention provides a photogrammetric scanning system which is able to acquire instantaneously and in a synchronized manner the human anatomical shapes, in particular by means of elements for the instant and synchronized acquisition of images which are synchronized with each other, to digitize them with an accuracy in the order of one millimeter and, then, to automatically derive landmarks, anthropometric measurements, volumetric indices of parts of the body of the subject to be photographed and/or specific body parameters starting from the so-reproduced three-dimensional digital model.

According to an alternative embodiment thereof, the system of the present invention can comprise all the structural, mechanical and electronic elements, already listed and described with reference to the device represented in FIG. 1.

With reference to FIG. 5, the system according to this alternative embodiment comprises a total number of elements for the instant and synchronized acquisition of images which is equal to two hundred one or two hundred and ten photographic sensors, according to an alternative configuration, from which nine photographic sensors may be subtracted wherein these nine photographic sensors are provided in the vertical pillar number V which may be removed to leave room for an entry opening, for example in form of a walk-in opened entrance), one hundred thirty-six of which (or one hundred forty-four according the previously mentioned alternative configuration) corresponding for the type, distribution on the support structure 5 and orientation of the optical axis of the optical sensors integrated therein to the elements 2 for the instant and synchronized acquisition of images of the previous embodiment.

In particular, in order to ensure a still more efficient reconstruction of barely visible anatomical areas of the subject to be photographed, that is the part upper of the head (indicated as additional area 2), the external area of the upper limbs (indicated as additional area 3), the internal area of the upper limbs (indicated as additional area 4), the internal area of the legs (indicated as additional area 5), the under-thigh, intended as the area below the pelvis (indicated as additional area 6), as well as the feet (indicated as additional area 7), this alternative embodiment comprises additional elements 2 for the instant and synchronized acquisition of images.

According to this alternative embodiment, at least some of the elements 2 for the instant and synchronized acquisition of images comprise integrated optical sensors whose orientation was modified with respect to that of the optical sensors integrated in the one hundred thirty-six (or one hundred forty-four) elements for the instant and synchronized acquisition of images having a first inclination angle and a second inclination angle of the optical axis of the optical sensors integrated therein being equal to zero.

In general, the elements for the instant and synchronized acquisition of images according to this embodiment are vertically arranged on the same seventeen (according to a configuration, eighteen) support elements according to six additional groups of photographic sensors directed towards the above-mentioned additional areas. In particular, indicating with 100—in FIGS. 5, 6a and 6b—the first group of photographic sensors relating also to the previous embodiment, the following further groups of photographic sensors for different groups of the elements for the instant and synchronized acquisition of images are provided:

a second group 200 for a better acquisition of the head, in which eighteen elements for the instant and synchronized acquisition of images are present, positioned on two vertical levels and on nine vertical pillars spaced apart from each other by an angle which is equal to 40 degrees, whose first level is placed at 1904 mm from the walking plane and whose second level is placed at 2100 mm from the walking plane, having a first inclination angle δ of the optical axis of the optical sensors integrated therein which is equal to +14 degrees (the positive value indicates a downward inclination value);

a third group 300 for a better acquisition of the external area of the upper limbs, in which eighteen elements for the instant and synchronized acquisition of images are present, positioned on three vertical levels and on six vertical pillars positioned in the area which is adjacent to the upper limbs, whose first level is placed at 1350 mm from the walking plane and in which the other levels are spaced apart by 215 mm, having a first inclination angle δ of the optical axis of the optical sensors integrated therein which is equal to +20 degrees to allow an optimum acquisition of the subject in the "standard" posture.

a fourth group 400 for a better acquisition of the internal area of the upper limbs corresponding to the underarms, in which eight elements for the instant and synchronized acquisition of images are present, positioned on two vertical levels and on four vertical pillars positioned in the front area and in the rear area with respect to the posture of the subject in the device, whose first level is placed at 346 mm from the walking plane and whose second level is vertically spaced apart by 202 mm, having a first inclination angle δ of the optical axis of the optical sensors integrated therein which is equal to −31 degrees and a second inclination angle ε which is comprised between ±8 degrees for the first level of photographic sensors and comprised between ±1 degree for the second level of photographic sensors. It should be noted that the yaw angles placed on two adjacent vertical pillars have a value which is equal and opposite in module.

a fifth group 500 for a better acquisition of the internal area of the lower limbs, in which sixteen elements for the instant and synchronized acquisition of images are present, positioned on four vertical levels and on four vertical pillars positioned in the front area and in the rear area with respect to the posture of the subject in the device, whose first level is placed at 101 mm from the walking plane (to allow an optimum acquisition of malleoli) and the other levels are spaced apart by 202 mm, having a first inclination angle δ of the optical axis of the optical sensors integrated therein which is equal to zero and a second inclination angle ε which is comprised between ±17 degrees.

a sixth group 600 for a better acquisition of the area below the pelvis, in which four elements for the instant and synchronized acquisition of images are present, positioned on a single vertical level and on four vertical pillars positioned in the front area and in the rear area with respect to the posture of the subject in the device, the vertical level is placed at 224 mm from the walking plane, having a first inclination angle δ of the optical axis of the optical sensors integrated therein which is equal to −37 degrees and a second inclination angle ε which is equal to zero degrees.

a seventh group 700 for a better acquisition of the part upper of the feet, in which two elements for the instant and synchronized acquisition of images are present, positioned on a single vertical level and on two vertical pillars positioned in the front area with respect to the posture of the subject in the device, whose level is placed at 894 mm from the walking plane, having a first inclination angle δ of the optical axis of the optical sensors integrated therein which is equal to +38 degrees and a second inclination angle ε which is comprised between ±3 degrees.

The inclination angles of the optical sensors of the devices for the instant and synchronized acquisition of images were calculated such that the direction of the optical sensors points towards the area of the body whose scanning is to be obtained, in a robust manner with respect to the percentiles of the population under examination, and were derived by trigonometric formulas.

The number, the position and the orientation of the optical sensors of the devices for the instant and synchronized acquisition of images are quoted in the table of FIG. 5. The fourth column of the table of FIG. 5 indicates, with specific reference numbers quoted in FIG. 3b, the supporting elements or vertical pillars on which the corresponding elements for the automatic and synchronized acquisition of images can be installed, specifically provided to photograph the specific parts of the body indicated for each row of the same table. In the configuration of the device with a specific entry opening, the vertical pillar number V is not present (FIG. 3b) and therefore, not even the nine devices for the instant and synchronized acquisition of images provided on the vertical pillar number V.

Figure 6A:
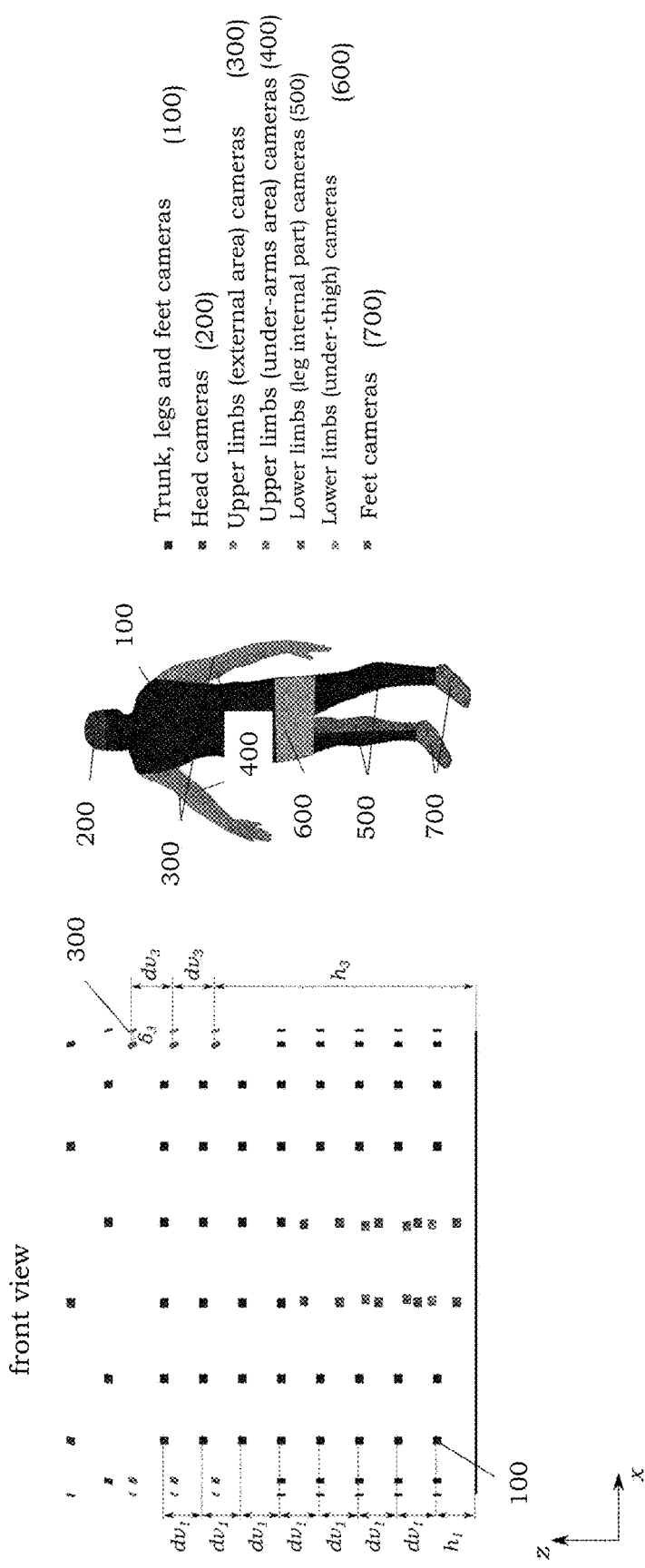
FIG. 6a shows the front view of the spatial distribution of the devices for the instant and synchronized acquisition of images of the system according to the embodiment of the invention of FIG. 5.
Figure 6B:
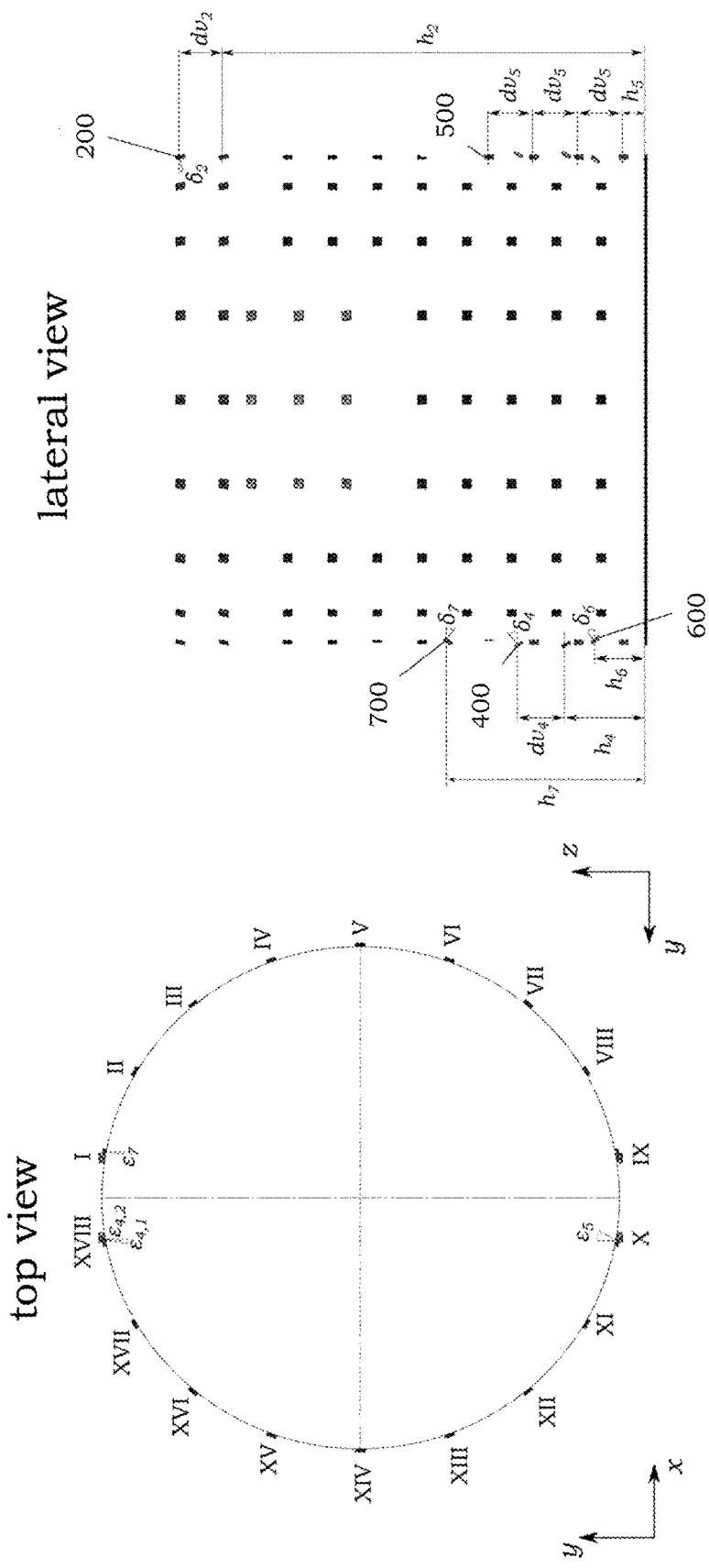
FIG. 6b shows the top view and the lateral view of the spatial distribution of the devices for the instant and synchronized acquisition of images of the system according to the embodiment of the invention of FIG. 5.

In particular, the front view, the top view and the lateral view of the arrangement of the devices for the instant and synchronized acquisition of images including the integrated optical sensors are depicted in FIG. 6a and FIG. 6b, with the indications of the above-mentioned variables, with the indication of the subscript which refers to the group of the devices used for the acquisition of specific areas of the human body, as previously described and quoted in the table of FIG. 5.

Figure 7:
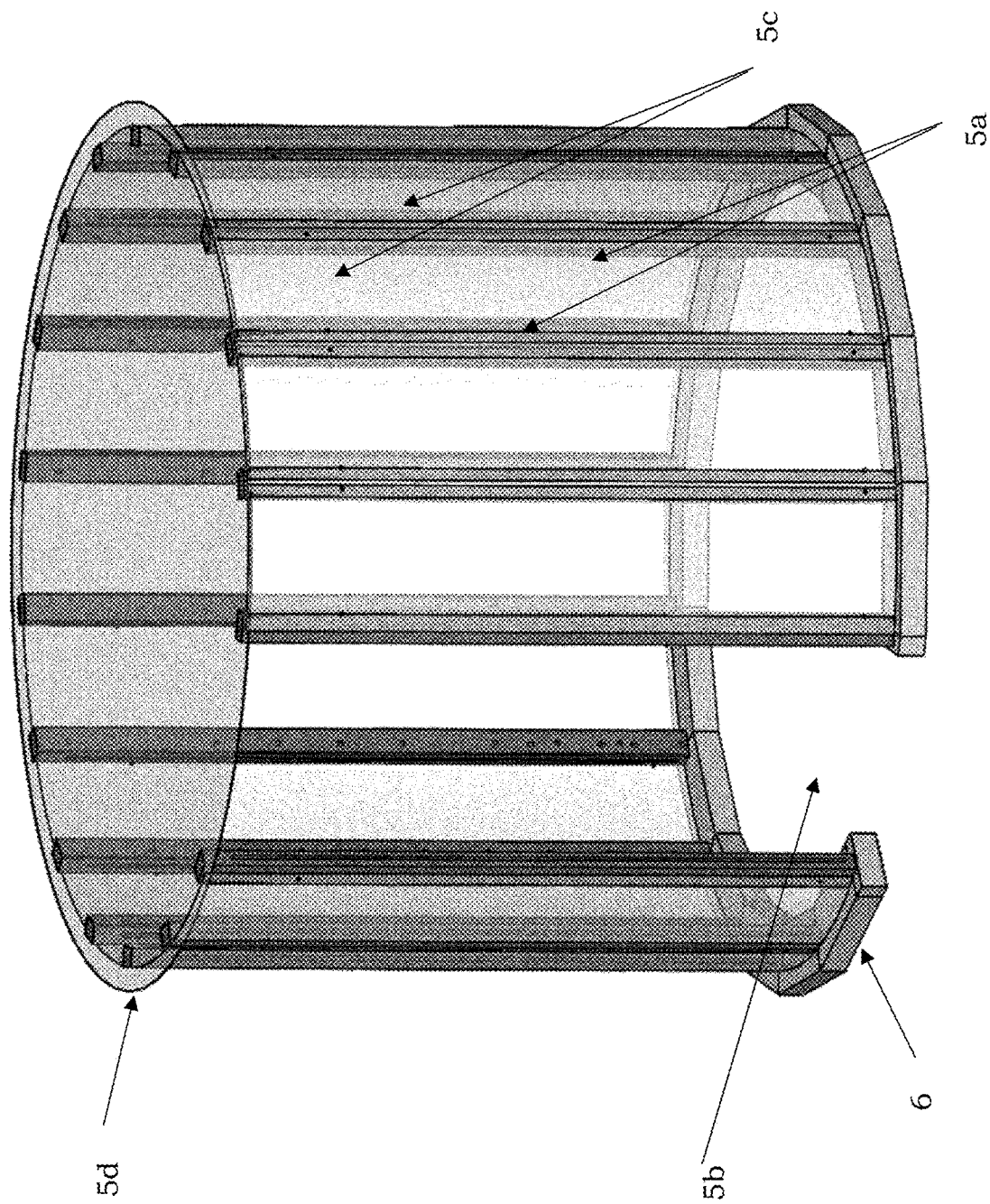
FIG. 7 shows an exemplary constructive embodiment of the support structure of the system of FIG. 1 or FIG. 5, showing in particular a modular support structure comprising support elements, lateral support panels anchored thereto, as well as an upper covering element, anchored to the support elements.
Figure 8:
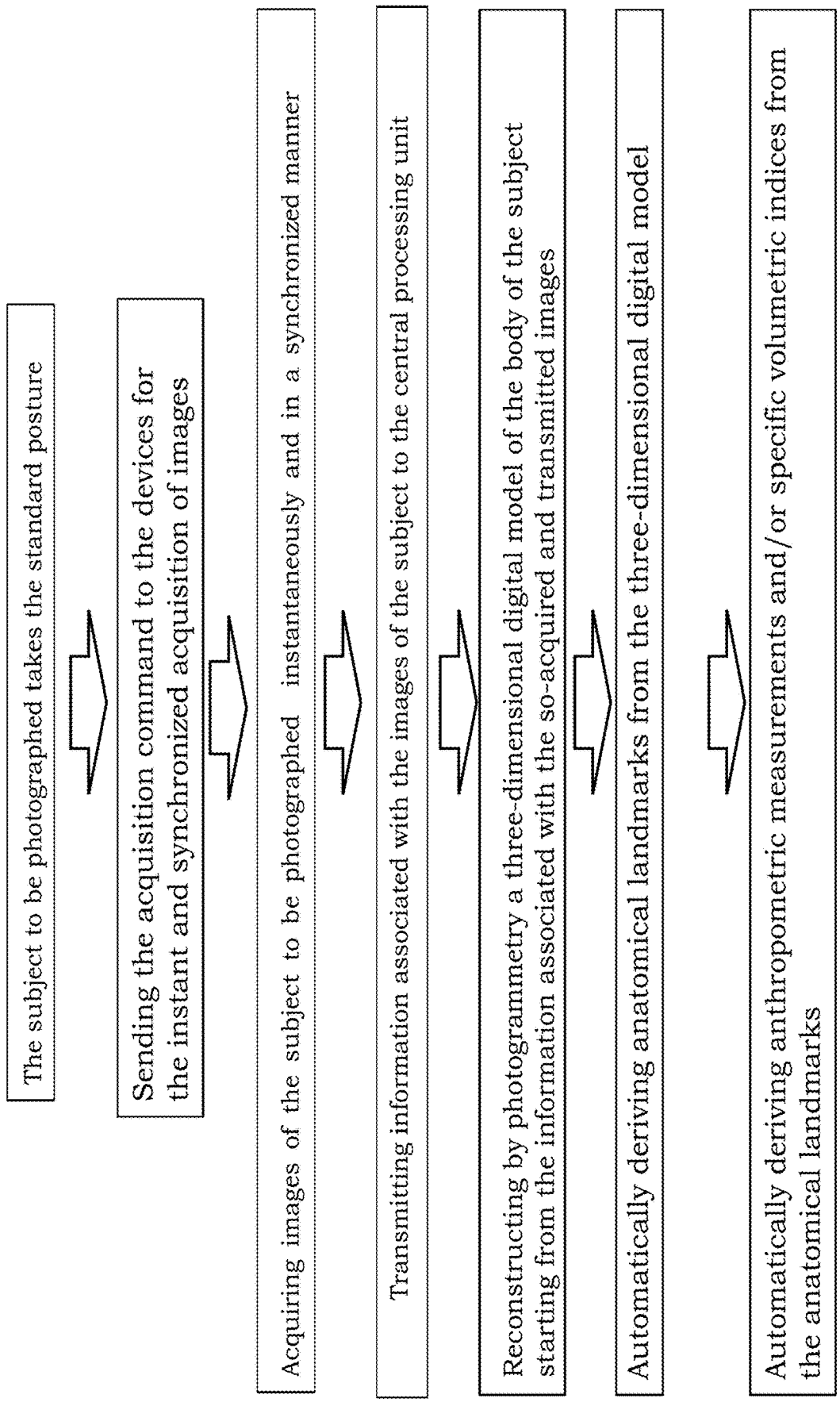
FIG. 8 shows an exemplary flow chart of the different steps of a form of application of the process according to the present invention.

The alternative technological solution of the support structure of FIG. 1 or FIG. 5 is depicted in FIG. 7, which shows in particular a modular support structure comprising support elements 5a, lateral support panels 5c anchored thereto, as well as an upper covering element 5d, anchored to the support elements.

The system according to the present invention of the above-described embodiments is advantageously useful to acquire images of the human body according to different acquisition postures, as per the previous paragraphs with reference to FIG. 2.

The system according to the present invention of the above-described embodiments proved to be particularly useful in applications in the medical field.

In particular, an application mode of the present system is thus described below.

First of all, the subject to be photographed, correctly in position inside the support structure, was invited to take and has taken the standard posture inside the scanning system.

Then, by means of the control device and the unit for wirelessly transmitting information, the operator initiates the acquisition step, sending a command to the elements for the instant and synchronized acquisition of images.

The subject to be photographed stays in position and images of the subject to be photographed are acquired instantaneously and in a synchronized manner.

Then, information associated with the so-acquired images are transmitted to the unit for wirelessly transmitting information and to the central processing unit.

In the central processing unit, a three-dimensional digital model of the body or even only of the trunk of the so-photographed subject is thus reconstructed, starting from the information associated with the acquired and transmitted images.

The reconstruction of the three-dimensional digital model is performed by photogrammetry.

Figure 9:
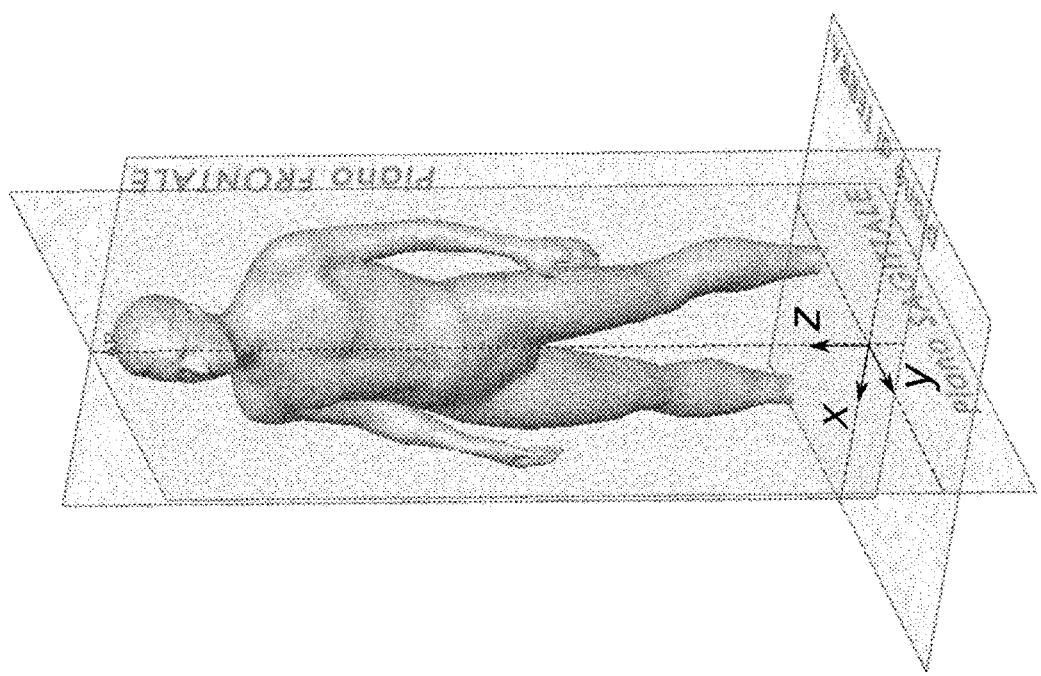
FIG. 9 shows an example of three-dimensional reconstruction of a subject, acquired in the standard posture, with the indication of the ground plane, of the front plane and of the sagittal plane.

The so-reconstructed three-dimensional digital model is shown in FIG. 9, where the reference system for the scanning surface 2 is also defined. The Figure indicates: "ground plane" (plane whose normal is the reference axis z); "sagittal plane" (plane which is orthogonal to the ground plane, which divides the body in two halves, that is the right half and the left half; whose normal is the axis x); "front plane" (plane which is orthogonal to the above-defined planes and passing through the point P which identifies the vertex of the head, defined as $P=P(x,y,z) \in \Omega : z=h$, where h is the height of the subject, evaluated as the difference between the vertex having the highest coordinate z and the vertical coordinate z of the ground plane.

Then, once the three-dimensional digital model is reconstructed, the central processing unit automatically derives proper anatomical landmarks on the surface of the three-dimensional digital model.

For identifying an anatomical landmark, their feature of appearing in the 3D scanning as a projection or recess was exploited. The procedure for the extraction of an anatomical landmark consists of three main steps: (i) definition of the area of interest on the body surface; (ii) analysis of the local curvature in the selected area; (iii) extraction of the anatomical landmark starting from the analysis of the local curvature.

The first sub-step for the extraction of the anatomical landmark is the identification of a specific body surface (indicated with SD) which contains the point. The extension ranges of these surfaces can be obtained from anatomical tables. As a landmark example, the left greater trochanter $GT_L$ identified on a body region $\delta\Omega_{GT_L}$ on the left part of the pelvis (FIG. 10, image a) is considered.

Figure 10:
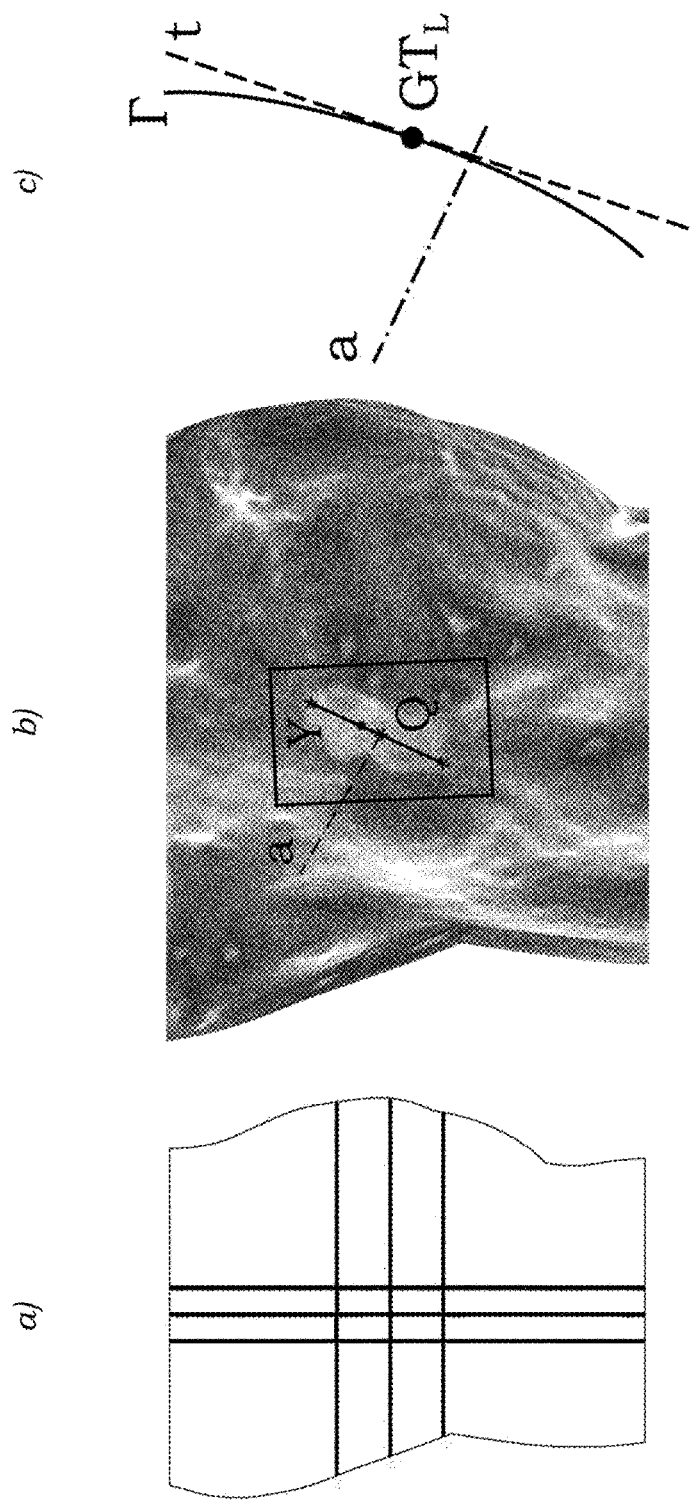
FIG. 10 shows an example of the procedure for the extraction of a landmark from a three-dimensional digital model of a subject.
Figure 11:
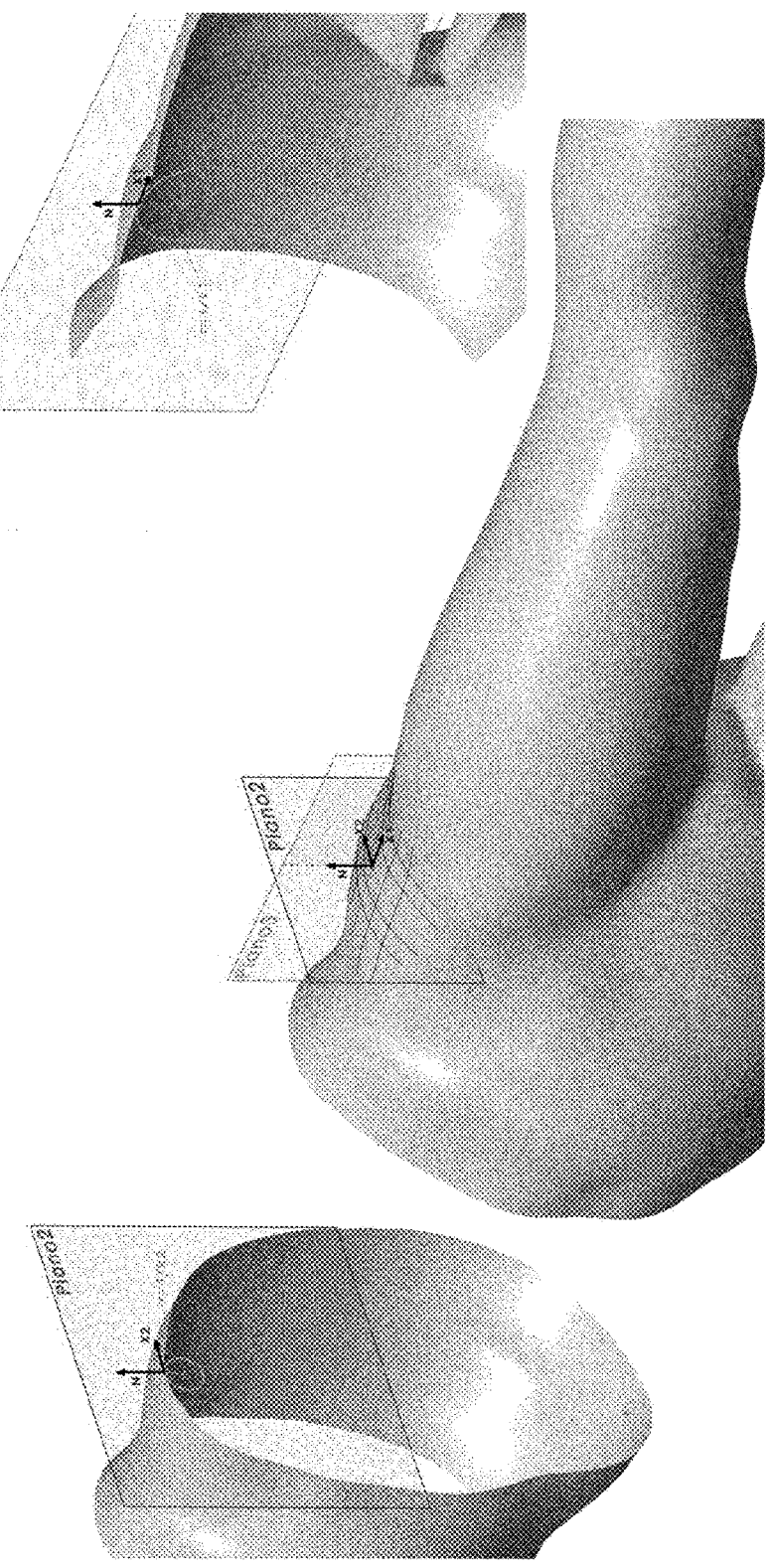
FIG. 11 shows the two maximum and minimum curvatures of a point belonging to a surface of the three-dimensional digital model, from which the Gauss curvature for the point is calculated.

The subsequent sub-step for the extraction of the anatomical landmark is the analysis of the local curvature, or Gauss curvature $k_g$, for each point belonging to the surface of interest. A generic point belonging to the surface is considered, and all the planes passing through the normal N to the surface in the selected point are considered. The intersection of each plane with the surface determines a plane curve whose curvature can be calculated. The so-obtained maximum and minimum curvature values are said main curvatures, and are indicated with $k_1$ and $k_2$, respectively. The value of the Gauss curvature for each point belonging to the surface is defined as the product of the two main curvatures, that is $k_g = k_1 \cdot k_2$. The graphic illustration of the calculation of the Gauss curvature for a generic point of the surface is shown in FIG. 11. Considering the Gauss curvature of all the points of the surface it is possible to obtain a colour map which is representative of the Gauss curvature for all the points (FIG. 10, image b), where white represents higher values of the Gauss curvature, while black represents lower values of the Gauss curvature.

The extraction of the anatomical landmark uses, for example, a generic construction starting from the analysis of the local curvature. The process makes use of the following construction, illustrated in FIG. 10, image b: first a construction point Q belonging to the surface $\delta\Omega_{GT_L}$ is considered and it is joined with a point at the same vertical elevation z belonging to the body axis; then a plane is defined, which comprises the point Q and is orthogonal to the straight line a drawn in the previous point; then the two extreme points representing the ends of the area having the maximum Gauss curvature are projected on this plane and the segment Y is drawn on the plane joining the two points; therefore the so-obtained segment is projected on the scanning surface, so as to obtain a curve $\Gamma$ and the straight line which is tangent to this curve t is considered; finally, the anatomical landmark $GT_L$ is given by the tangency point between $\Gamma$ and t (FIG. 10, image c).

Starting from these anatomical landmarks proper anthropometric measurements were therefore automatically derived, such as linear and angular distances. For example, once the greater left trochanter $GT_L$ and the greater right trochanter $GT_R$ are identified with the above-described procedure, it is possible to calculate the width of the pelvis as the distance between two points and the angle in the front plane xz, that is the inclination of the pelvis, through a known trigonometric relationship.

The system according to the present invention of the above-described embodiments is particularly useful to identify volumetric indices, even in the order of one mm³.

Figure 12:
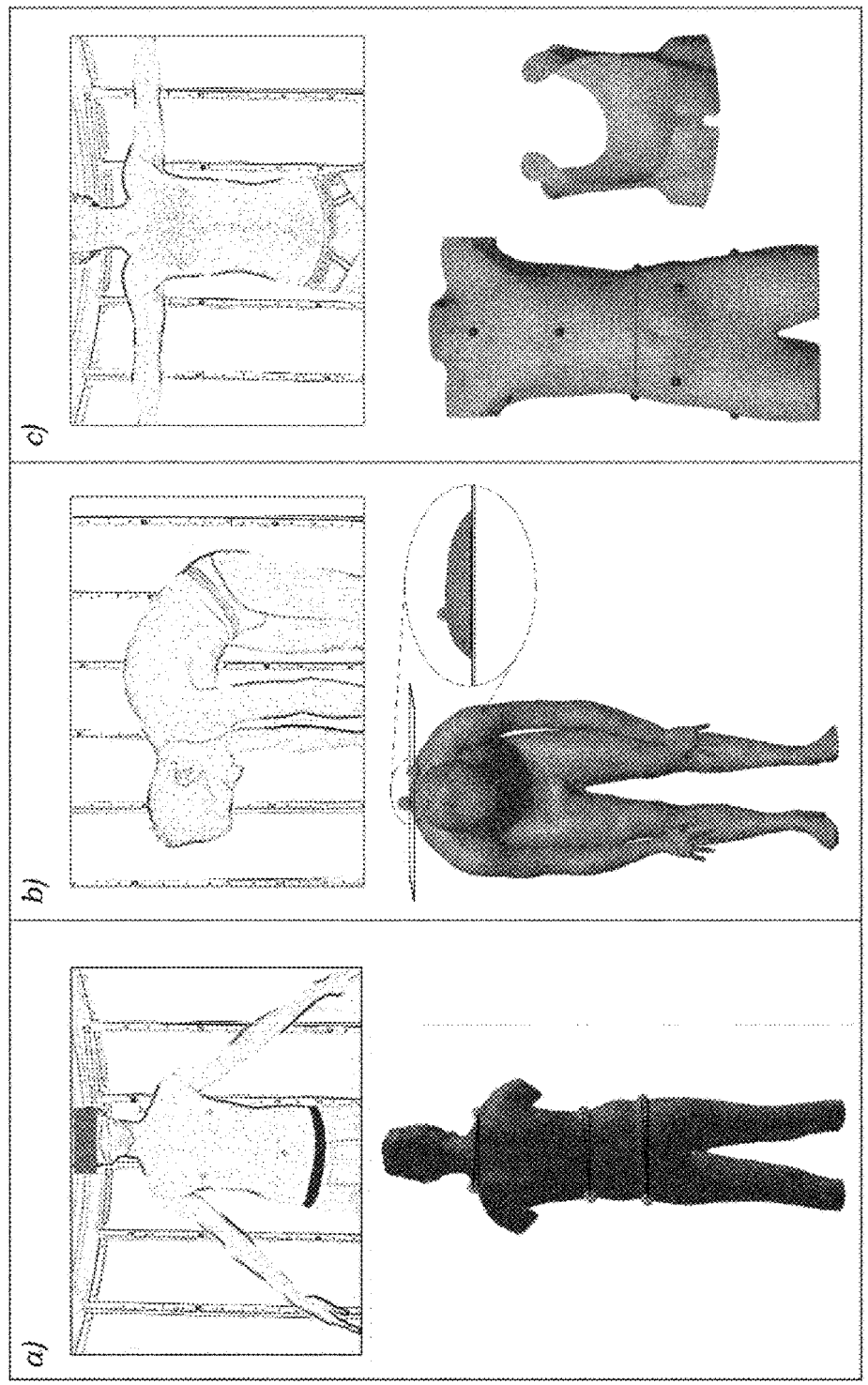
FIG. 12 shows the subject to be photographed during three respective acquisition steps in which the subject takes three different postures: standard, Adams, T-pose, together with the three-dimensional digital models reconstructed during the subsequent reconstruction step, in which anatomical landmarks, anthropometric measurements and specific volumetric indices are shown. In particular, in the Figure on the left a three-dimensional model reconstructed starting from the standard posture is shown, in which anatomical landmarks and angular distances are shown; in the Figure in the center, a three-dimensional model reconstructed starting from the standard posture is shown, in which anatomical landmarks are shown, from which a volumetric body index is obtained; in the Figure on the right, a three-dimensional model reconstructed starting from the T-pose posture is shown, in which anatomical landmarks and a linear distance anthropometric measurement are shown, all information which are necessary for the production of a tailored spinal orthosis.

Starting from a three-dimensional triangular mesh, for example with the subject acquired in the "Adams" posture, it is possible to evaluate the volumetric index of the rear projection (i.e., volume of the rear hump $V_G$ in FIG. 12, image b) with the following procedure:

(i) Identification of the most projecting point of the half-side of the convexity of the scoliotic curve, that is the landmark $RH=RH(x_{RH}, y_{RH}, z_{RH})$, uniquely identified by associating it with the point having the maximum absolute value along the vertical axis z;

(ii) Identification, along the axis x, of two auxiliary values $x_{min}$ and $x_{max}$ (medio-lateral extremes) and the two distances $$d_1 = x_{max} - x_{RH}$$

$$d_2 = x_{min} - x_{RH}$$

Such that:

If $d_1 > d_2$ then RH is on the side of $x_{max}$

If $d_2 > d_1$ then RH is on the side of $x_{min}$ (iii) Identification of the most projecting point of the contralateral half-side of the convexity of the scoliotic curve, that is the landmark $RHC=RH(x_{RHC}, y_{RHC}, z_{RHC})$, which is represented by the point having the maximum absolute value along the vertical axis z uniquely identified within a sub-volume If RH is on the side of $x_{max}$: $x_{min} < x < x_{medio}$ If RH is on the side of $x_{min}$: $x_{medio} < x < x_{max}$ where $x_{medio}$ is the average value between $x_{min}$ and $x_{max}$ (iv) Identification of the plane which is tangent to RHC parallel to the front plane (which, in the "Adams" posture, is parallel in turn to the ground resting plane);

(v) The three-dimensional surface $S_G$ of interest is the one above the tangent plane identified with (iv), until the anatomical landmark RH. Starting from this surface, the vertices, the triangular faces and the outgoing normals are extracted.

(vi) The volume $V_G$ enclosed by the surface $S_G$ is calculated by using the divergence theorem as $$V_G = \int \nabla \cdot F dV = \int F \cdot n dS_G$$

where: $\nabla$ is the divergence operator; F is the flow vector which represents the triangular surface; n is the normal vector going out from the surface $dS_G$.

The system according to the present invention of the above-described embodiments is advantageously used, according to a typical application to which the invention is dedicated, both in the monitoring field and in the field of the treatment of disorders or dysfunctions linked to body morphology alterations, such as for example spinal disorders. On the one hand, the automatic extraction of typical anthropometric measurements and/or of volumetric body indices allow a quick monitoring of the evolution of the alteration over time. On the other hand, the derivation of an accurate 3D model in the order of one mm$^3$ and the automatic extraction of specific body measures allow the customized design of orthoses, for example spinal orthoses, tailored orthopaedic devices aimed at limiting and/or solving disorders which cause deformities of the bones of the concerned anatomical area. In particular, referring to the most common spinal disorder, that is scoliosis, from the acquisition of the subject in the "standard" position (FIG. 12, image a) it is possible to evaluate anatomical landmarks such as the greater right trochanter and the greater left trochanter, in addition to the right acromion and the left acromion. Therefrom it is possible to obtain specific measurements such as the inclination of the shoulders or of the pelvis, as previously described, indices of body symmetry for a global postural evaluation of the subject. From the acquisition of the subject in the "Adams" position (FIG. 12, image b) the three-dimensional reconstruction is carried out for the extraction of different anatomical landmarks, such as the most projecting point of the half-side of the convexity of the scoliotic curve and the most projecting point of the contralateral half-side of the convexity of the scoliotic curve. From which it is possible to obtain a very particular index such as the volume of the rear projection (i.e., volume of the rear hump, index which can also be equal to a few mm$^3$, which thus requires, for the correct extraction thereof, a highly accurate device). In particular, the volume of the rear hump is an index of the body alteration evolution. Finally, from the acquisition of the subject in the "T-pose" position (FIG. 12, image c) the three-dimensional reconstruction of the trunk-pelvis area used for manufacturing a tailored spinal orthosis is carried out. The optimum design of this orthopaedic device requires, in addition to a highly accurate 3D model of the subject, some specific measurements such as the latero-lateral distance of the iliac crests required for the creation of a suitable pelvic support basket, which is well shaped along the profile of the crests.

Ultimately, the system according to the present invention can be advantageously used both in the field of the evaluation of disorders which alter the body morphology and in the field of the production of customized orthopaedic devices for limiting and/or solving these alterations.

What is claimed is:

1. A system for an image acquisition and three-dimensional digital reconstruction of human anatomical shapes comprising:
   a support structure configured to rest on a walking plane and having a perimeter sized to surround a subject to be photographed;
   a plurality of elements fixed to the support structure and arranged vertically at preset heights and spaced apart horizontally from one another at respective intervals along the perimeter of the support structure, wherein each of the plurality of elements comprises an optical sensor, wherein the optical sensors are configured to simultaneously acquire images and to communicate image information associated with the acquired images;
   a central processing unit configured to perform photogrammetry to reconstruct a three-dimensional digital model based on the image information and to derive anatomical landmarks, anthropometric measurements, volumetric indices of parts of the body of the subject to be photographed or specific body parameters from the three-dimensional digital model; and
   a control device configured to receive the image information, transmit the image information to the central processing unit, and receive information relating to the three-dimensional digital model therefrom,
   wherein the optical sensors comprise an optical axis having a first inclination angle that is fixed and preset with respect to a horizontal direction and a second inclination angle that is fixed and preset with respect to a vertical direction; and
   wherein at least eighteen elements of the plurality of elements are positioned on the support structure at a height that is between 1.85 m and 2.2 m, and the first fixed and preset inclination angle of the optical axis with respect to the horizontal direction of the optical sensors comprised therein is between +10 and +20 degrees, wherein respective horizontal spacing between each of the at least eighteen elements is different between one another.

2. The system for the image acquisition according to claim 1, wherein at least nine elements of the plurality of elements are positioned on the support structure at a height between 1.90 m and 1.92 m, and at least nine other elements of the plurality of elements are positioned on the support structure at a height between 2.08 m and 2.12 m, and the first fixed and preset inclination of the optical axis with respect to the horizontal direction of the optical sensors integrated therein is between +10 and +20 degrees.

3. The system for the image acquisition according to claim 1, wherein one or both of the fixed and preset first inclination angle and the fixed and preset second inclination angle of the optical axis of the optical sensors comprised therein are selected on the basis of an average between the following stature percentiles of the subject to be photographed: 3rd percentile of male subjects, 50th percentile of male subjects, 97th percentile of male subjects, 3rd percentile of female subjects, 50th percentile of female subjects and 97th percentile of female subjects.

4. The system for the image acquisition according to claim 1, wherein the first fixed and preset inclination angle of the optical axis with respect to said horizontal direction of said integrated optical sensors of at least a portion of the plurality of elements is between −45 and +45 degrees.

5. The system for the image acquisition according to claim 4, wherein the second fixed and preset inclination angle of the optical axis with respect to the vertical direction of the optical sensors of at least a portion of the plurality of elements is between −20 and +20 degrees.

6. The system for the image acquisition according to claim 1, wherein the optical sensors of the plurality of elements are photographic sensors.

7. The system for the image acquisition according to claim 1, wherein the control device is configured to communicate commands to the plurality of elements that cause respective optical sensors of the plurality of elements to simultaneously acquire images.

8. The system for the image acquisition according to claim 1,
   wherein the central processing unit comprises at least one memory unit configured to store one or more of: three-dimensional digital models, anatomical landmarks, anthropometric measurements, volumetric indices of parts of the body of the subject to be photographed, specific body parameters, or any combination thereof, wherein the memory unit comprises at least one database configured to store one or more of: a) corresponding standard normal values of the anatomical landmarks, anthropometric measurements, volumetric indices of parts of the human body, specific body parameters, or any combination thereof, and b) anatomical landmarks, anthropometric measurements, volumetric indices of parts of the body of the subject to be photographed, specific body parameters, or any combination thereof automatically derived from previously performed acquisitions of images of the subject to be photographed, and wherein the central processing unit is configured to compare one or more of: the anatomical landmarks, anthropometric measurements, volumetric indices of parts of the body of the subject to be photographed, specific body parameters, or any combination thereof automatically derived from the three-dimensional digital model, with one or more of: a) the corresponding standard normal values of said anatomical landmarks, anthropometric measurements, volumetric indices of parts of the human body or specific body parameters, or b) the anatomical landmarks, anthropometric measurements, volumetric indices of parts of the body of the subject to be photographed or specific body parameters automatically derived from previously performed acquisitions of images of the subject to be photographed, stored in the at least one database.

9. A process for the image acquisition and three-dimensional digital reconstruction of human anatomical shapes performed by the system of claim 8, the process comprising:
acquiring, in a synchronized manner, images of a subject to be photographed;
wirelessly transmitting information associated with the acquired images;
reconstructing a three-dimensional digital model of anatomical shapes of the subject to be photographed starting from the image information;
automatically deriving one or more of: anatomical landmarks, anthropometric measurements, volumetric indices of parts of the body of the subject to be photographed, specific body parameters, or any combination thereof from the three-dimensional digital model; and
comparing one or more of: the anatomical landmarks, anthropometric measurements, volumetric indices of parts of the body of the subject to be photographed, specific body parameters, or any combination thereof and that are automatically derived from the three-dimensional digital model with corresponding standard normal values, or with anatomical landmarks, anthropometric measurements, volumetric indices of parts of the body of the subject to be photographed, or specific body parameters automatically derived from previously performed acquisitions of images of the subject to be photographed, to obtain respective comparison values;
wherein reconstructing of the three-dimensional digital model is performed via photogrammetry.

10. The system for the image acquisition according to claim 1, wherein the plurality of elements are configured to wirelessly communicate the image information.

11. The system for the image acquisition according to claim 10, wherein each of the plurality of elements is configured to wirelessly communicate the image information, wirelessly receive the commands, or perform both operations.

12. The system for the image acquisition according to claim 11, wherein the control device is configured to wirelessly communicate the image information.

* * * * *